(12) United States Patent
Li et al.

(10) Patent No.: US 12,271,232 B2
(45) Date of Patent: Apr. 8, 2025

(54) FLEXIBLE DISPLAY DEVICE AND DISPLAY SYSTEM

(71) Applicant: KunShan Go-Visionox Opto-Electronics Co., Ltd, Jiangsu (CN)

(72) Inventors: Junfeng Li, Kunshan (CN); Rubo Ying, Kunshan (CN); Jingsong Tang, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 181 days.

(21) Appl. No.: 17/859,270

(22) Filed: Jul. 7, 2022

(65) Prior Publication Data
US 2022/0374049 A1    Nov. 24, 2022

Related U.S. Application Data

(63) Continuation of application No. PCT/CN2020/099483, filed on Jun. 30, 2020.

(51) Int. Cl.
*G06F 1/16* (2006.01)
*H04M 1/02* (2006.01)

(52) U.S. Cl.
CPC ........ *G06F 1/1652* (2013.01); *H04M 1/0268* (2013.01); *G06F 2200/1613* (2013.01)

(58) Field of Classification Search
None
See application file for complete search history.

(56) References Cited

U.S. PATENT DOCUMENTS

| | | | | |
|---|---|---|---|---|
| 11,108,011 | B2* | 8/2021 | Kim | H10K 50/8423 |
| 11,914,423 | B2* | 2/2024 | Shin | G06F 1/1624 |
| 2014/0049463 | A1* | 2/2014 | Seo | G06F 1/1694 |
| | | | | 345/156 |
| 2016/0239050 | A1 | 8/2016 | Kim et al. | |
| 2020/0335729 | A1* | 10/2020 | Wu | G02F 1/133 |
| 2021/0352814 | A1* | 11/2021 | Park | G06F 1/1652 |

(Continued)

FOREIGN PATENT DOCUMENTS

| | | |
|---|---|---|
| CN | 105518766 A | 4/2016 |
| CN | 206322700 U | 7/2017 |
| CN | 107492310 A | 12/2017 |

(Continued)

OTHER PUBLICATIONS

International Search Report (with English Translation) and International Written Opinion mailed on Mar. 25, 2021, in corresponding International Application No. PCT/CN2020/099483; 9 pages.

(Continued)

*Primary Examiner* — Courtney L Smith
(74) *Attorney, Agent, or Firm* — Maier & Maier, PLLC

(57) ABSTRACT

One or more embodiments of the description relates to a flexible display device and a display system. The flexible display device includes: a screen component and a support structure disposed on the screen component. The flexible display device has different stiffness in a first direction and in a second direction. The first direction is a direction in which the screen component curls up, and the second direction is perpendicular to the first direction.

19 Claims, 23 Drawing Sheets

(56) References Cited

U.S. PATENT DOCUMENTS

2022/0167509 A1* 5/2022 Wu .................. H10K 77/111
2022/0376201 A1* 11/2022 Kim .................. H10K 77/111

FOREIGN PATENT DOCUMENTS

| | | | |
|---|---|---|---|
| CN | 107526188 | A | 12/2017 |
| CN | 207818085 | U | 9/2018 |
| CN | 109032251 | A | 12/2018 |
| CN | 109872639 | A | 6/2019 |
| CN | 110767096 | A | 2/2020 |
| CN | 110792905 | A | 2/2020 |
| CN | 110992837 | A | 4/2020 |
| CN | 210627726 | U | 5/2020 |
| JP | 2020513579 | A | 5/2020 |

OTHER PUBLICATIONS

Office Action issued on May 18, 2023, in corresponding Chinese Application No. 202080087406.1 (Partial English translation provided), 8 pages.

Office Action issued on Oct. 16, 2023, in corresponding Chinese Application No. 202080087406.1, 9 pages including partial English translation.

* cited by examiner

FLEXIBLE DISPLAY DEVICE AND DISPLAY SYSTEM

CROSS REFERENCE TO RELATED APPLICATION

This application is a continuation of International Application No. PCT/CN2020/099483 filed on Jun. 30, 2020 and entitled "FLEXIBLE DISPLAY DEVICE AND DISPLAY SYSTEM", the disclosure of which is incorporated herein by reference in its entirety.

TECHNICAL FIELD

The application relates to the technical field of display device, and in particular to a flexible display device and a display system.

BACKGROUND

With the development of display technology, flexible display devices are gradually entering the market. A screen component of a flexible display device may be developed when it is needed and retracted by curling when it is not needed. Since the screen component of the flexible display device has rollable property, the screen component of the flexible display device in a developed state is possibly incapable of keeping flat, thereby affecting display effect thereof.

Therefore, it is required to provide a flexible display device both facilitating curling of a screen component and achieving a good display effect.

SUMMARY

An embodiment of the description provides a flexible display device including: a screen component and a support structure disposed on the screen component. The flexible display device has different stiffness in a first direction and in a second direction. The first direction is a direction in which the screen component curls up, and the second direction is perpendicular to the first direction.

In some embodiments, the flexible display device has a stiffness of 0.1 GPa-10 GPa in the first direction, and the flexible display device has a stiffness of 10 GPa-300 GPa in the second direction.

In some embodiments, the support structure includes a plurality of support members distributed in the first direction.

In some embodiments, a material of the support members includes: steel or titanium alloy or aluminum alloy or glass or carbon fiber or glass fiber or any combination of the above materials.

In some embodiments, the support members have a stiffness of 50 GPa-300 GPa.

In some embodiments, the support structure further includes a flexible polymeric material between adjacent two of the support members.

In some embodiments, the support structure includes a first portion having a first stiffness and a second portion having a second stiffness, and the second stiffness is greater than the first stiffness.

In some embodiments, the support structure includes a support membrane, and the first portion and the second portion are different regions in the support membrane respectively.

In some embodiments, the first portion includes a first material, the second portion includes a second material, and a stiffness of the second material is greater than a stiffness of the first material.

In some embodiments, a material of the second material includes a flexible polymeric material.

In some embodiments, a ratio of a size of the plurality of support members in the first direction to a size of a gap adjacent to one of the support members in the first direction is 1:10-1:1, or a ratio of a size of the plurality of second portions in the first direction to a size of a gap adjacent to one of the second portions in the first direction is 1:10-1:1.

In some embodiments, if the flexible display device is in a uniaxial curled form or in a double-axis curled form, a ratio of the size of the plurality of support members in the first direction to a gap adjacent to one of the support members in the first direction is 1:10-1:1, or a ratio of the size of the plurality of second portions to a gap adjacent to one of the second portions in the first direction is 1:10-1:1.

In some embodiments, the plurality of support members or the plurality of second portions are distributed non-uniformly relative to the screen component in the first direction, such that a stiffness of the screen component in the first direction is non-uniform.

In some embodiments, in the first direction, the flexible display device includes at least a first region and a second region, and a stiffness of the first region in the first direction is greater than a stiffness of the second region in the first direction.

In some embodiments, the support structure includes a support membrane with a plurality of pattern holes.

In some embodiments, the plurality of pattern holes include a plurality of pattern columns arranged in the second direction, and adjacent pattern columns have different separation distances.

In some embodiments, a separation distance between adjacent pattern columns is 0.1 mm-4 mm.

In some embodiments, the pattern holes have an open porosity of 0.2-0.8 with respect to a specified region on the support membrane.

An embodiment of the description provides a display system including the flexible display device described above, and a terminal device connected to the flexible display device.

BRIEF DESCRIPTION OF THE DRAWINGS

This application will be further illustrated by way of exemplary embodiments, and the exemplary embodiments will be described in detail with reference to the accompanying drawings. The embodiments are not intended to be limiting. In the embodiments, like numerals refer to like structures, wherein.

DETAILED DESCRIPTION

Figure 1:
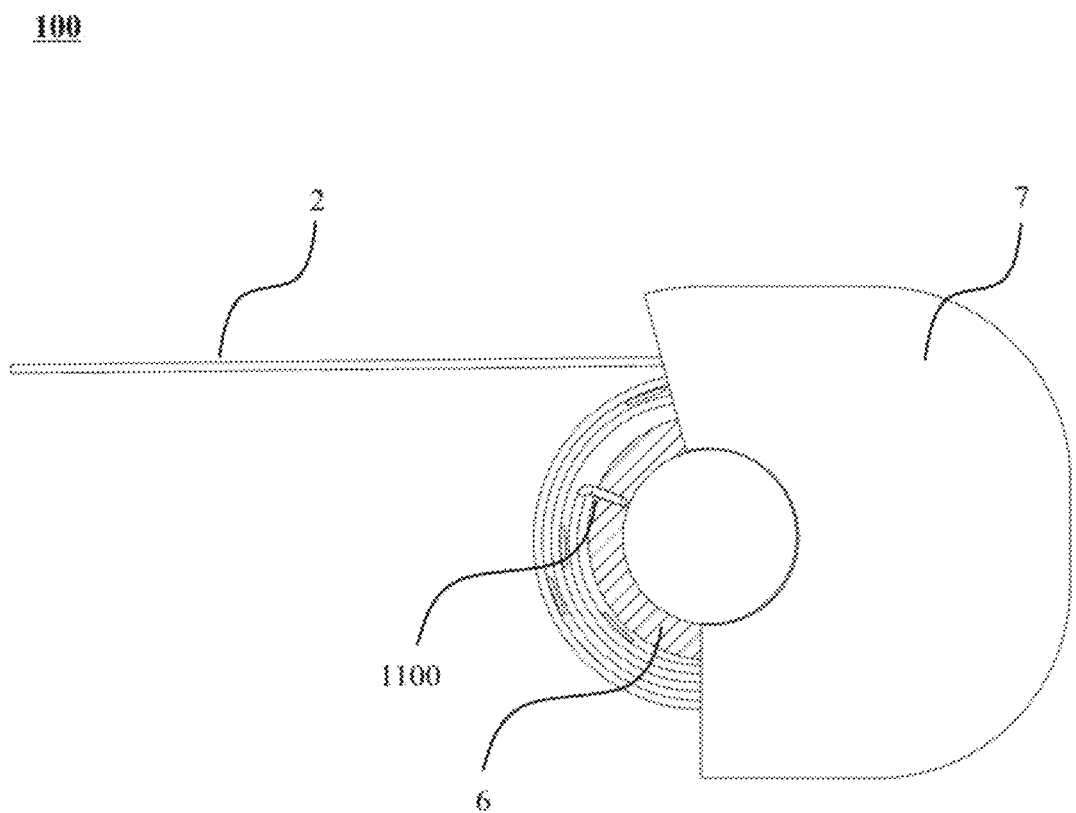
FIG. 1 is an assembled perspective view of a flexible display device shown according to some embodiments of the application.

Exemplary embodiments or implementations will be described in detail herein, and the examples thereof are represented in the accompanying drawings. When the following description involves the drawings, like numerals in different drawings refer to the same or similar elements, unless otherwise indicated. The implementations described in the following exemplary embodiments do not represent all the embodiments consistent with the application. Rather, they are merely examples of apparatuses and methods consistent with some aspects of the application, as detailed in the appended claims.

The terms used in the application are only for the purpose of describing specific embodiments and is not intended to limit the application. "a", "said" and "the" used in a singular form in the application and the appended claims are also intended to encompass a plural form unless the context clearly indicates otherwise.

It is to be understood that the terms "first", "second" and the like used in the description and claims do not represent any order, quantity or importance, but merely serve to distinguish between different components. Also, the term "a" or "an" or the like do not represent a quantitative limit, but represent that there is at least one. Unless otherwise specified, the terms such as "front", "rear", "lower" and/or "upper" are only for convenience of explanation and are not limited to a location or a spatial orientation. The terms such as "comprise" or "include" means that the elements or items preceding the "comprise" or "include" encompass the elements or items listed after the "comprise" or "include" and their equivalents, and other elements or items are not excluded.

A flexible display device of one or more embodiments of the application is applicable to display systems of different electronic products. The different electronic products may include, but are not limited to, cellphones, personal computers, keyboards, displayers, televisions, vehicle-mounted display terminals, e-books, and the like. The flexible display device of the embodiments of the application can unfold a screen component thereof when it is needed and retract the screen component thereof by curling when it is not needed, in order to save space. As an example, the flexible display device of the embodiments of the application may be applied to a television as a display screen of the television. When the television is turned off or is not required to display pictures, the display screen of the television can be curled up to save space; when the television is turned on or is required to display pictures, the display screen of the television can be developed into a flat screen. As yet another example, the flexible display device of the embodiments of the application may be used as a separate display accessory, i.e., the flexible display device may be connected to various terminal devices (e.g., a cellphone, a personal computer and the like) to be used as an external display device thereof. When the terminal device is required to perform developed display, the flexible display device can be connected to the terminal device and unfold the screen component for displaying; when the terminal device is not required to perform developed display, the flexible display device can curl the screen component thereof up for easy portability.

As shown in FIG. 1, a flexible display device 100 may include a screen component 2 and a support shaft 6. In some embodiments, the support shaft 6 is connected to an end 1100 of the screen component 2 for curling up the screen component 2 when the flexible display device 100 is not required to display. In some embodiments, when the flexible display device 100 is required to display, the screen component 2 may be developed around the support shaft 6. In some embodiments, a connection of the support shaft 6 to the end 1100 of the screen component 2 may be a fixed connection or a detachable connection. In some embodiments, the type of the fixed connection may include, but is not limited to, integral molding, adhering, pinning and the like. In some embodiments, the type of the detachable connection may include, but is not limited to, snapping, plugging connection and the like.

In some embodiments, the flexible display device 100 may further include a storage device 7. In some embodiments, the storage device 7 may be used to receive the curled screen component 2. In some embodiments, the support shaft 6 may be disposed inside the storage device 7 and connected to the end 1100 of the screen component 2. In some embodiments, when the screen component 2 is required to be curled, the support shaft 6 may bring the end 1100 of the screen component 2 into curling, such that the screen component 2 is gradually curled onto and covers the support shaft 6.

In some embodiments, the flexible display device 100 may further include a drive device for driving the support shaft 6 to perform a winding operation. In some embodiments, that drive device may include, but is not limit to, a spring drive mechanism, a motor drive mechanism, a ratchet drive mechanism and a gear drive mechanism. In some embodiments, the drive device may be disposed inside the storage device 7 in order to save a space of flexible display device 100 and enhance an aesthetic degree of entire appearance of the flexible display device 100. In some embodiments, the drive device may further include a user control module disposed inside a storage device 7. The user control module can collect control instructions of a user and transmit the control instructions to the drive device. The user control module may collect the control instructions of the user in a contactless manner. In some embodiments, a type of the user control module may be gesture recognition module, voice control module and the like. Taking the voice control module as an example, the drive device collects a voice control instruction of a user of the flexible display device 100 via the voice control module, and controls the support shaft 6 to rotate according to the content of the voice control instruction, in order to enable storage or unfoldment of the screen component 2. In some embodiments, the drive device may also be a torsion spring disposed inside the storage device 7. The torsion spring is torsionally deformed and stores elastic potential energy when the screen component 2 is developed, and when the screen component 2 is required to be wound up, the torsion spring may drive the support shaft 6 by releasing the elastic potential energy to wind the screen component 2 up.

In some embodiments, the screen component 2 may also be used to provide a touch control function. In some embodiments, a user of the flexible display device 100 may operate a picture displayed by the screen component 2 by touching on the screen component 2. In some embodiments, the type of a display part used for displaying pictures in the screen component 2 may include, but is not limited to: Organic Light Emitting Diode (OLED), Light Emitting Diode (LED), Micro Light Emitting Diode (Micro LED), Mini Light Emitting Diode (Mini LED) and the like.

Figure 2:
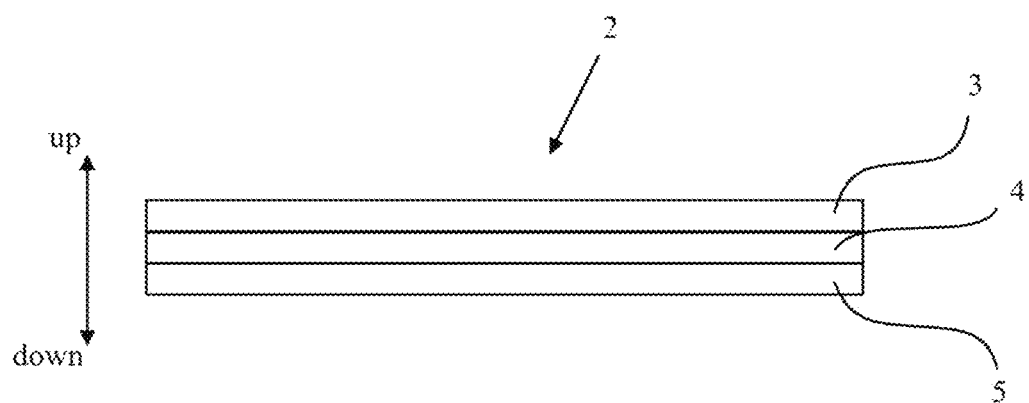
FIG. 2 is a schematic structural view of a screen component shown according to some embodiments of the application.

In some embodiments, the screen component 2 may be a multilayer structure. In some embodiments, the screen component 2 may include a display part layer 3, an array structure layer 4 and a flexible substrate 5. Here, the order of each layer from bottom to top is the flexible substrate 5, the array structure layer 4 and the display part layer 3, as shown in FIG. 2. That is, the display part layer 3 may be located at the uppermost layer of the screen component 2, the array structure layer 4 may be located between the display part layer 3 and the flexible substrate 5, and the flexible substrate 5 may be located at the lowermost layer of the screen component 2.

In some embodiments, the display part layer 3 may include a membrane layer emitting light. For example, the display part layer 3 may include an OLED light emitting layer, the OLED light emitting layer includes a plurality of pixel units arranged in an array, and the pixel units emit light to enable the display part layer 3 to display a picture. In some embodiments, the screen component 2 further includes a touch control layer, and the touch control layer may be disposed above the display part layer 3 for receiving a user's touch operation or protecting the display part layer 3. In some embodiments, the touch control layer may include a touch control device for allowing a user to perform touch control on the flexible display device 100. In some embodiments, the touch control layer may include a non-contact induction part for a user to control the flexible display device 100 via a relevant gesture. In some embodiments, the touch control layer may include cover glass for protecting the display part layer 3 from being damaged by an impact.

In some embodiments, the array structure layer 4 may be used to provide a display-related control part for the display part layer 3. In some embodiments, the array structure layer 4 may include a pixel drive circuit, and the pixel drive circuit is electrically connected to the display part layer 3 for controlling a displayed picture of the display part layer 3. In some embodiments, the pixel drive circuit may include, but is not limited to, a TFT (Thin Film Transistor) part, a capacitor part and the like.

In some embodiments, the flexible substrate 5 may be a base material membrane layer of the screen component 2 for supporting the display part layer 3 and the array structure layer 4. In some embodiments, the material of the flexible substrate 5 may include, but is not limited to, polyimide (PI) material, polyethylene terephthalate (PET) material, polybenzimidazoles (PBI) material, polyetheretherketone (PEEK) material, polyvinylidene fluoride (PVDF) material, polyphenylenesulphide plastic (PPS) material, and any combination of the above materials; in further embodiments, the flexible substrate 5 may also be glass material with bending property, and it is only necessary to ensure that the thickness of the glass meets the bending requirement. In some embodiments, in several constituent materials of the flexible substrate layer 5, the mass proportion of polyimide is 50%-100%; in some embodiments, in several constituent materials of the flexible substrate layer 5, the mass proportion of polyimide is 60%-90%. In some embodiments, the mass proportion of polyethylene terephthalate is 0-20%; in some embodiments, the mass proportion of polyethylene terephthalate is 0-10%; in some embodiments, the mass proportion of polyethylene terephthalate is 0-4%. In some embodiments, the mass proportion of polybenzimidazoles is 0-30%; in some embodiments, the mass proportion of polybenzimidazoles is 5-20%; in some embodiments, the mass proportion of polybenzimidazoles is 0-4%. In some embodiments, the mass proportion of polyvinylidene fluoride is 0-10%; in some embodiments, the mass proportion of polyvinylidene fluoride is 0-5%. In some embodiments, the mass proportion of polyphenylenesulphide plastic is 0-10%; in some embodiments, the mass proportion of polyphenylenesulphide plastic is 0-5%.

In some embodiments, the screen component 2 may further include a buffer layer. In some embodiments, the buffer layer may be used to provide a buffer effect when the screen component 2 is impacted. In some embodiments, a buffer layer may be disposed below the flexible substrate 5 and between the flexible substrate 5 and the support structure. In some embodiments, the material of the buffer layer may include, but is not limited to, foam material, such as polyurethane (PU) foam, silicon foam, and acrylic foam.

In some embodiments, since the screen component 2 is flexible, when the screen component 2 is in a developed state, the surface of the screen component 2 under the effect of a force is possibly incapable of maintaining flat, thereby affecting display effect of the screen component 2. The screen component 2 of the embodiments of the application can obtain different stiffnesses in directions with different stiffness requirements. In a first direction along the curled direction thereof, the screen component 2 may obtain lower stiffness, so that the screen component 2 is easy to be curled for storage; in a second direction perpendicular to the curled direction thereof, the screen component 2 may obtain higher stiffness, so that the entire screen component 2 is not easy to be deformed under effect of an external force, thereby ensuring the display effect of the screen component 2.

The screen component 2 of some embodiments of the application may be provided with a support structure on the back surface, and the support structure can bring about lower stiffness in the first direction and higher stiffness in the second direction, so that the screen component 2 not only has the performance easy to be curled, but also it can ensure the flatness when the screen component 2 is developed. The structure is further described below in conjunction with the accompanying drawings.

It should be understood that the application scenarios of the system and method of one or more embodiments of the description are only some examples of one or more embodiments of the description, and for a person of ordinary skill in the art, one or more embodiments of the description may also be applied to other similar scenarios, for example, other display systems, according to these drawings without creative work.

Figure 3A:
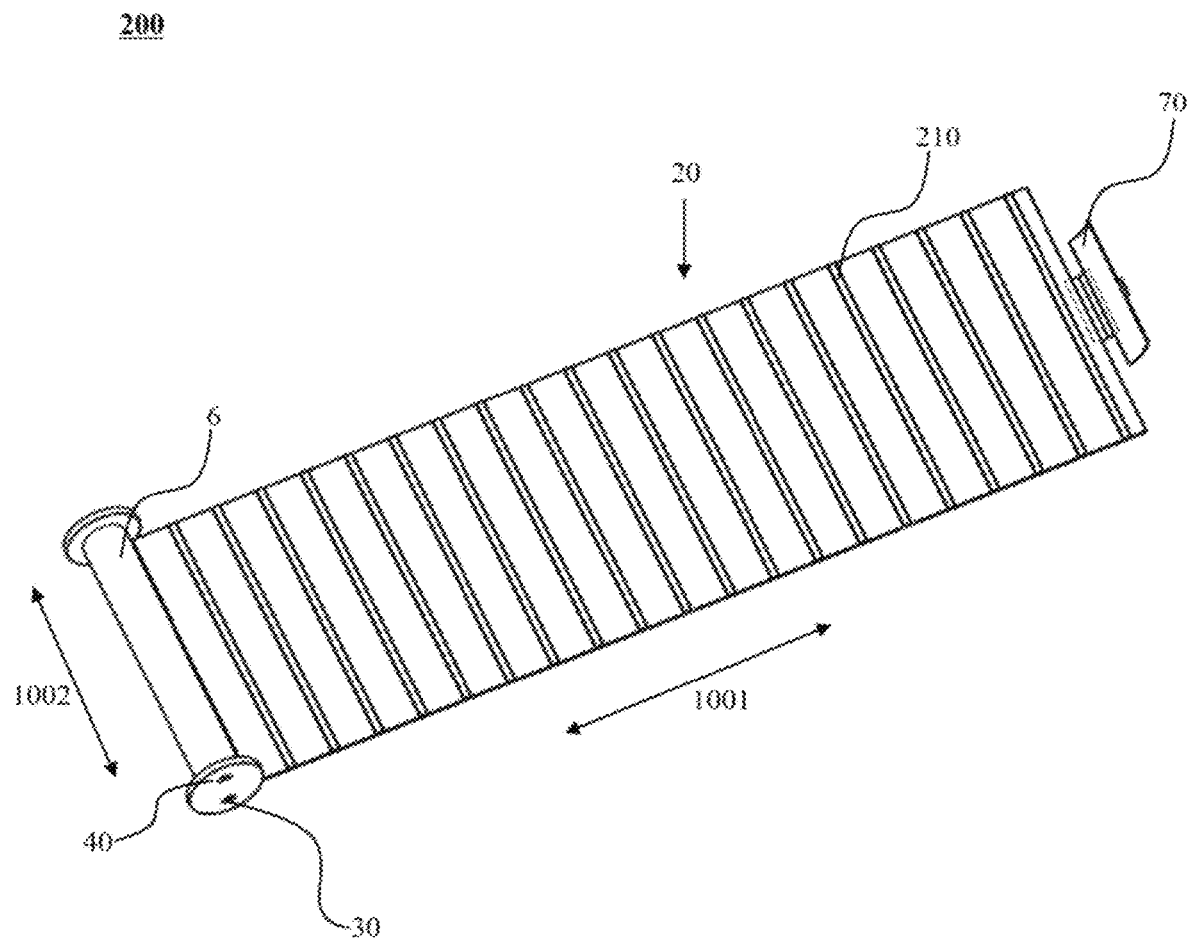
FIG. 3A is a schematic view of a flexible display device in a developed state and in a uniaxial curled form shown according to some embodiments of the application.
Figure 3B:
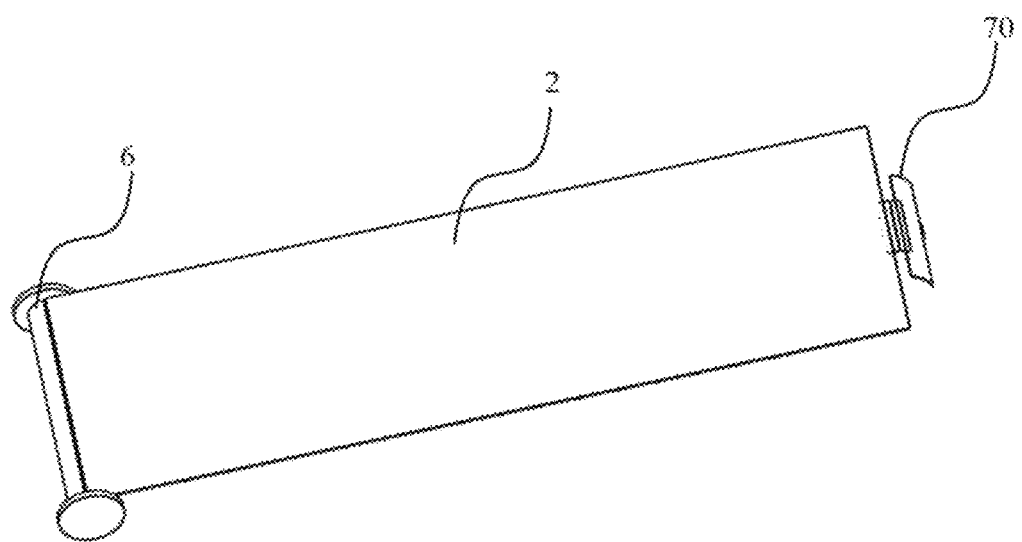
FIG. 3B is another schematic view of a flexible display device in a developed state and in a uniaxial curled form shown according to some embodiments of the application.
Figure 3C:
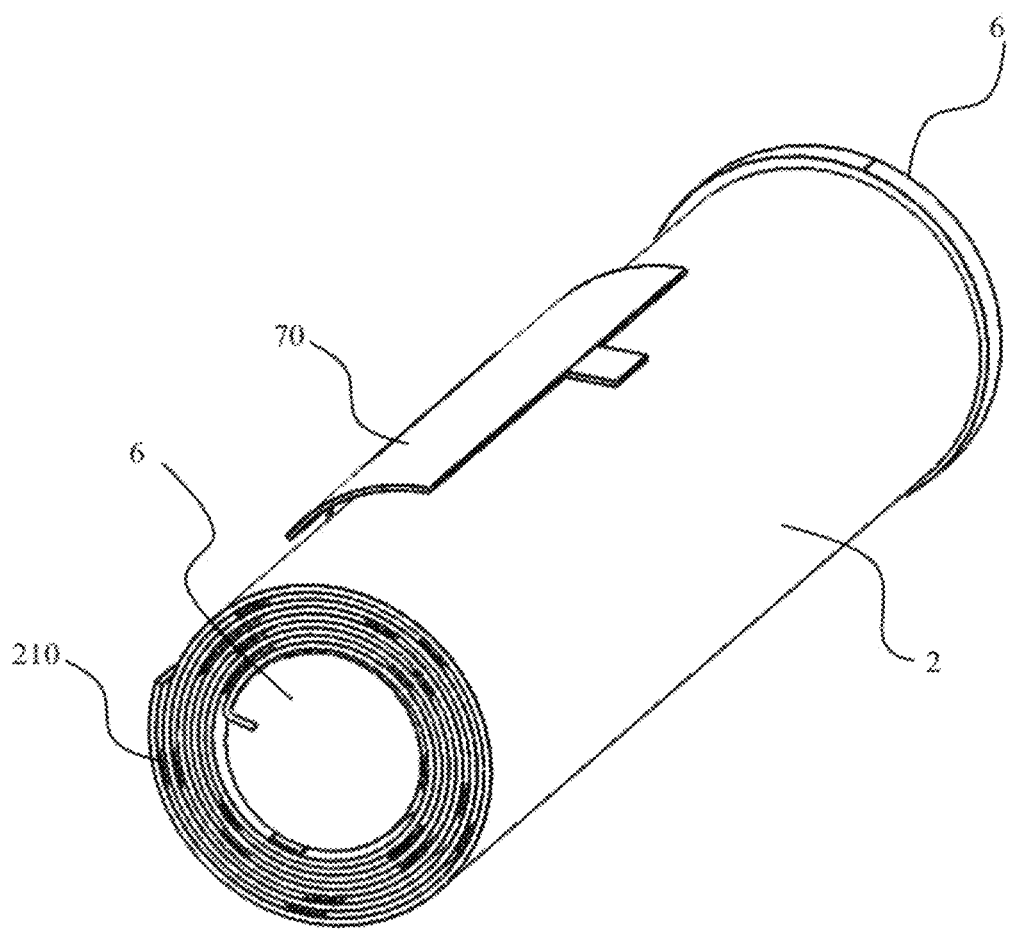
FIG. 3C is a schematic structural view of a flexible display device in a curled state shown according to some embodiments of the application.

In some embodiments, as shown in FIGS. 3A-3C, a flexible display device 200 may include a screen component 2 and a support structure 20. The support structure 20 is disposed on the screen component 2 for supporting the screen component 2. In some embodiments, the support structure 20 may be disposed on the back surface of the screen component 2. Herein, the back surface of the screen component 2 may be interpreted as the surface away from the light emitting surface of the screen component 2.

In some embodiments, the support structure 20 may be disposed on the back surface of the lowermost layer in the screen component 2, for example, the support structure 20 may be disposed on the back surface of the flexible substrate 5. In some embodiments, the support structure 20 may also be disposed inside the screen component 2, that is, the support structure may be disposed at any position between the front surface of the lowermost layer and the back surface of the uppermost layer in the screen component 2. For example, the support structure 20 may be disposed between the flexible substrate 5 and the array structure layer 4. Herein, for several membrane layers in the screen component 2, the surface facing towards the light emitting surface of the screen component 2 is the front surface, and the surface facing away from the light emitting surface of the screen component 2 is the back surface. In some embodiments, the support structure 20 may be used to support the screen component 2 in the developed state. In some embodiments, the support structure 20 may be connected to the screen component 2. In some embodiments, the connection of the support structure 20 to the screen component 2 may include, but is not limited to, adhering, electrostatic adherence, magnetic attraction and the like. In some embodiments, the support structure 20 and screen component 2 have different materials. In some embodiments, the material of the support structure 20 may include steel, titanium alloy, aluminum alloy, glass, carbon fiber and glass fiber. In some other embodiments, the material of the support structure 20 may further include silica gel, rubber and hydrogel in addition to steel, titanium alloy, aluminum alloy, glass, carbon fiber and glass fiber. In some embodiments, the material of the support structure 20 may be uniform, or may also include two or more materials. In some embodiments, the support structure 20 and the screen component 2 may also have the same material.

In some embodiments, the flexible display device 200 may further include a power interface 30. In some embodiments, the power interface 30 may be used to connect a power source providing power required for operation to the flexible display device 200. In some embodiments, the flexible display device 200 may have no power interface 30, and the flexible display device 200 is provided with a power source by a built-in battery.

In some embodiments, the flexible display device 200 may further include a signal interface 40. In some embodiments, the signal interface 40 may be used to connect the flexible display device 200 to a signal source. In some embodiments, the signal source may be any type of terminal device capable of outputting image data, including, but not limited to, a cellphone, a tablet computer, a personal computer, a television, a game machine and the like. In some embodiments, the signal interface 40 may be a wired interface. In some embodiments, the wired interface may include, but is not limited to, an interactive digital visual interface (DVI) interface, a high definition multimedia interface (HDMI) interface, an analog interface (D-subminiature, D-sub), a video graphics array (VGA) interface, a data processing (DP) interface, a universal serial bus (USB) interface and the like. In some embodiments, the signal interface 40 may also be a wireless interface. In some embodiments, the wireless interface may be any type of wireless network interface, including, but not limited to, a local area network (LAN) interface, a wide area network (WAN) interface, a wireless local area network (WLAN) interface, a metropolitan area network (MAN) interface, a Bluetooth network interface, a ZigBee wireless network interface, a near-field communication (NFC) network interface and the like.

In some embodiments, the power interface 30 and the signal interface 40 may also be implemented integrally, that is, the flexible display device 200 may provide an interface capable of providing a power connection for the flexible display device while connecting the flexible display device 200 to the signal source. It should be noted that the flexible display device 200 may also have no power interface 30 and signal interface 40, and this will not affect the display property and support property of the flexible display device 200, and is not limited in the application.

In some embodiments, the screen component 2 of the flexible display device 200 may be developed when required (as shown in FIGS. 3A and 3B) and retracted by curling when not required. In some embodiments, the screen component 2, when being curled, may be curled starting from two ends of the screen component 2 in the curled direction; or may also be curled starting from one of the two ends of the screen component 2. In some embodiments, the curled direction of the screen component 2 refers to the direction in which the screen component 2 is curled from the end starting curling to the other end. In some embodiments, as shown in FIG. 3A, the curled direction of the screen component 2 may be a first direction 1001, and the direction perpendicular to the curled direction may be a second direction 1002.

Figure 4A:
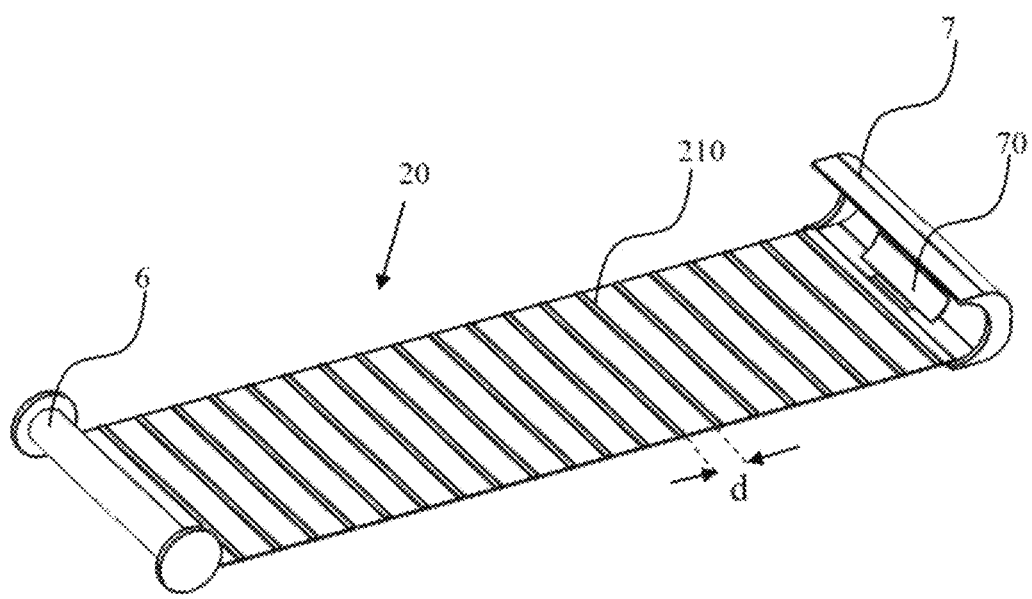
FIG. 4A is another schematic view of a flexible display device in a developed state shown according to some further embodiments of the application.
Figure 4B:
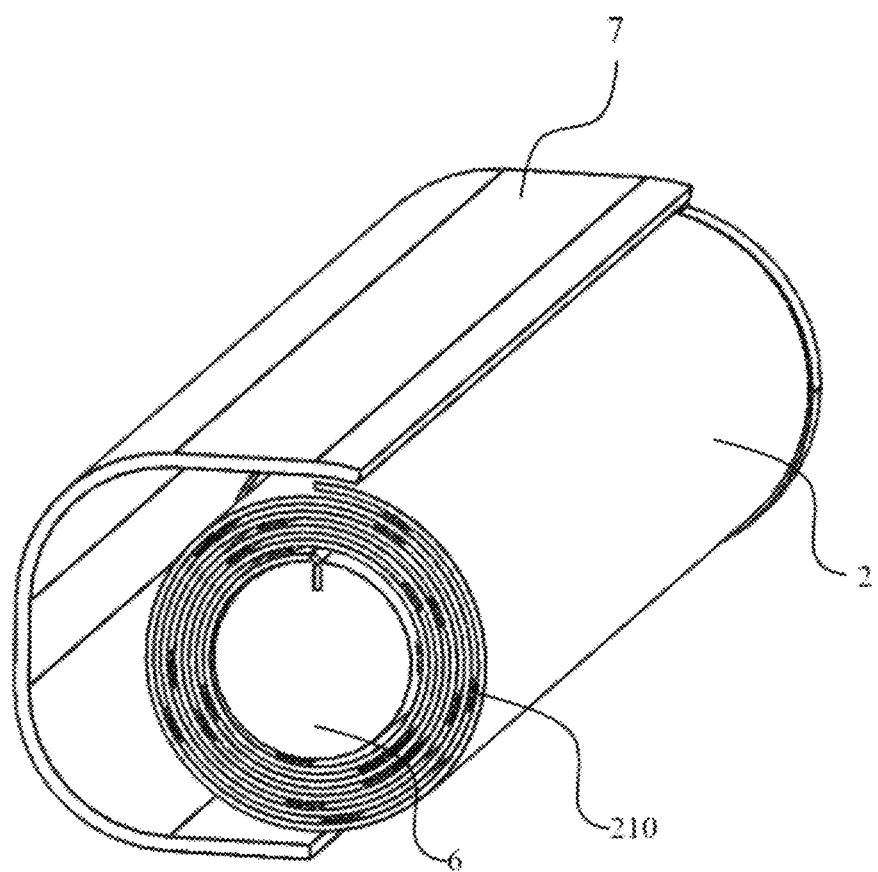
FIG. 4B is a schematic structural view of a flexible display device in a curled state shown according to some further embodiments of the application.

In some embodiments, referring to FIGS. 4A and 4B, the flexible display device 200 may be in a uniaxial curled form. In this case, the flexible display device 200 may further include a support shaft 6, and the support shaft 6 is fixed, in the second direction 1002, to either end side of the screen component 2 perpendicular to the first direction 1001. Here, the support shaft 6 is disposed at an end of the screen component 2. In some embodiments, the axis of the support shaft 6 is parallel to the second direction, so that the screen component 2 can be curled around the support shaft 6 in the first direction. In some embodiments, the support shaft 6 may be used to support the screen component 2 in the second direction 1002 when the screen component 2 is developed. In some embodiments, when the screen component 2 is curled, the support shaft 6 may support the curled screen component 2 as a central shaft of curling. In the flexible display device 200 of the embodiment, when the screen component 2 is developed, the support shaft 6 may support the screen component 2 to improve the ability of the screen component 2 to remain flat; when the screen component 2 is curled, the support shaft 6 may make the screen component 2 easier to be curled and take up less space after be curled.

Figure 5A:
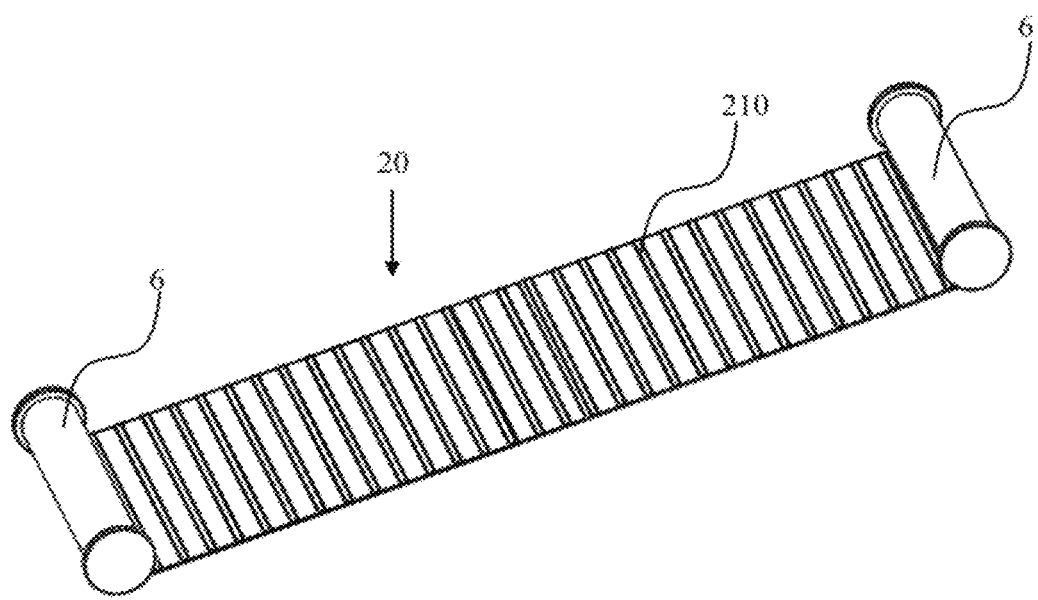
FIG. 5A is a perspective view of a back structure of a flexible display device in a developed state and in a double-axis curled form shown according to some embodiments of the application.
Figure 5B:
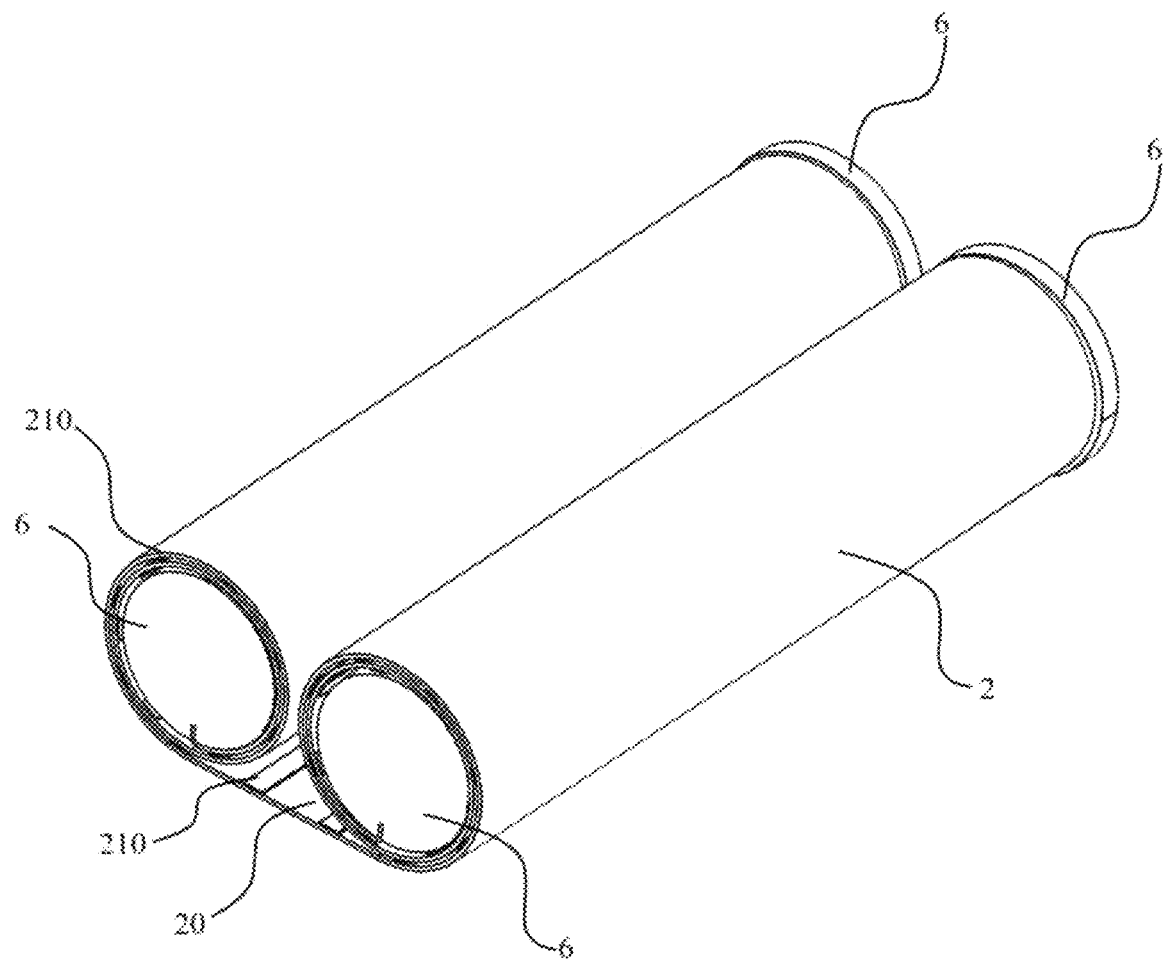
FIG. 5B is a schematic structural view of a flexible display device in a curled state and in a double-axis curled form shown according to some other embodiments of the application.

In some embodiments, referring to FIGS. 5A and 5B, the flexible display device 200 may also be in a double-axis curled form. In this case, the flexible display device 200 may include two support shafts 6, and the two support shafts 6 are fixed, in the second direction 1002, to the two opposite end sides of the screen component 2 perpendicular to the first direction 1001. Herein, both axes of the two support shafts 6 are parallel to the second direction, so as to curl the screen component 2 around the two support shafts 6 in the first direction respectively. In some embodiments, when the screen component 2 is curled, the two support shafts 6 rotate in opposite directions, that is, during curling of the screen component 2, the two support shafts 6 rotate relative to each other in the first direction respectively, and finally rotate to a position contacting with each other, as shown in FIG. 5B. In some embodiments, the two support shafts 6 may be used to support two sides of the screen component 2 in the second direction 1002 respectively when the screen component 2 is developed. In some embodiments, when the screen component 2 is curled, the two support shafts 6 rotate in opposite rotation directions, and the two support shafts 6 may act as a support shaft upon curling respectively to wind the screen component 2 of the screen component 2 and the support structure 20 onto the outer surface of the support shaft 6, as shown in FIG. 5B. In some embodiments, when the screen component 2 is curled, the two support shafts 6 rotate in opposite rotation directions (for example, one of the support shafts 6 rotates clockwise and the other support shaft 6 rotates counterclockwise), and during curling of the screen component 2, the two support shafts 6 move towards each other in the first direction respectively, and finally rotate to a position contacting with each other, forming a shape of "binoculars" as shown in FIG. 5B. In some embodiments, when the screen component 2 is curled, the two support shafts 6 rotate in the same direction (for example, both the support shafts 6 rotate clockwise, or both the support shafts 6 rotate counterclockwise), and during curling of the screen component 2, the two support shafts 6 move towards each other in the first direction respectively, and finally rotate to a position contacting with each other, forming a shape of "8". In the flexible display device 200 of the embodiment, when the screen component 2 is developed, the support shaft 6 may support the screen component 2 from both sides, the supporting capacity is stronger, and the screen component 2 is easier to maintain flat; when the screen component 2 is curled, the support shaft 6 may also play a role in assisting curling.

In some embodiments, the flexible display device 200 may also have no support shaft 6. When the screen component 2 is curled, the screen component 2 may be directly curled up by manual assistance, and the screen component 2 is wound up by itself, and is no longer wound on the support shaft 6. At this time, the screen component 2 may be curled up from either end to the other end, or may be curled up from both ends to the middle.

In some embodiments, as shown in FIGS. 4A and 4B, the flexible display device 200 may further include a storage device 7. In some embodiments, the storage device 7 may be used to store the screen component 2 when the screen component 2 is curled, so as to protect the screen component 2 from damage or contamination by foreign objects. In some embodiments, the support shaft 6 may be disposed inside the storage device 7. In some embodiments, the storage device 7 may be disposed in the second direction 1002 at either end side of the screen component 2 perpendicular to the first direction 1001. In some embodiments, the amount of the storage devices 7 may be the same as the amount of the support shafts 6. For example, the flexible display device 200 is in the uniaxial curled form, and there may be one storage device 7 disposed at one of the ends of the screen component 2. For another example, the flexible display device 200 is in the double-axis curled form, and there may be two storage devices 7 disposed at the two ends of the screen component 2 respectively.

In some embodiments, if the flexible display device 200 is in the uniaxial curled form, referring to FIG. 4A, the support shaft 6 may not be always stored in the storage device 7, and the storage device 7 and the support shaft 6 may be disposed at the two opposite sides of the screen component 2 respectively. In some embodiments, when the screen component 2 is developed, the storage device 7 is located at the side opposite to the support shaft 6, and the storage device 7 and the support shaft 6 may support the screen component 2 from the two sides of the screen component 2. Further referring to FIG. 4B, in some embodiments, when the screen component 2 is curled, the screen component 2 may be wound on the support shaft 6, and the storage device 7 may store the support shaft 6 wound with the screen component 2.

In some embodiments, the flexible display device 200 may automatically unfold the screen component 2 when required to be used, and may automatically curl the screen component 2 up when not required to be used. In order to achieve automatic action of the flexible display device 200, the flexible display device 200 may further include one or more drive devices to drive the support shaft 6 to rotate, so as to achieve automatic unfoldment or automatic curling and storage.

In some embodiments, the drive device may include a first drive device, and the first drive device may be disposed inside the storage device 7 (not shown in the drawings). In some embodiments, the first drive device may drive the support shaft 6 to perform a first rotation, so as to curl and store the screen component 2, that is, to wind the screen component 2 on the surface of the support shaft 6. In some embodiments, the first rotation may be a rotation around the central axis of the support shaft 6. In some embodiments, the first rotation may be a clockwise rotation, or may also be a counterclockwise rotation. In some embodiments, the first drive device may include, but is not limit to, a spring drive mechanism, a motor drive mechanism, a ratchet drive mechanism and a gear drive mechanism. Specifically, in some embodiments, the screen component 2 may be developed in a manual manner. For example, an operator of the flexible display device may start pulling from one end of the screen component 2 to unfold the screen component 2 from the support shaft 6. When the screen component 2 of the flexible display device is required to be curled, the first drive device may drive the support shaft 6 to perform the first rotation, and rewind the developed screen component 2 on the support shaft 6. For example, the first drive device may be a spring drive mechanism fixed on the support shaft 6, and the screen component 2 may drive the support shaft 6 to rotate during unfoldment and make the spring drive mechanism accumulate elastic potential energy. After the pulling force of the screen component 2 disappears, the spring drive mechanism may release the elastic potential energy to drive the support shaft 6 to rotate. For another example, the first drive device may be a one-way rotating motor drive mechanism. After the screen component 2 is manually developed, the support shaft 6 may be driven by the one-way rotating motor drive mechanism to perform the first rotation, so as to wind the screen component 2 on the support shaft 6.

In some embodiments, the drive device may further include a second drive device, and the second drive device may also be disposed inside the storage device 7 for driving the support shaft 6 to perform the second rotation, so as to unfold the screen component 2, that is, to unfold the screen component 2 in the curled state. In some embodiments, the second rotation may also be a rotation around the central axis of the support shaft 6. In some embodiments, the first rotation and the second rotation are in different directions. In some embodiments, the second drive device may include, but is not limit to, a spring drive mechanism, a clockwork drive mechanism, a motor drive mechanism, a ratchet drive mechanism, a gear drive mechanism and the like. Specifically, in some embodiments, the screen component 2 may be curled in a manual manner. For example, a rocker mechanism may be provided on the support shaft 6, and the operator of the flexible display device may shake the rocker mechanism to rotate the support shaft 6, so as to wind the screen component 2 on the support shaft 6. When the screen component 2 is required to be developed, the second drive device may drive the support shaft 6 to perform the second rotation, so as to unfold the screen component 2 on the support shaft 6. For example, the second drive device may be a clockwork drive mechanism fixed on the support shaft 6, and the screen component 2 during curling may wind up the clockwork drive mechanism. The clockwork drive mechanism when being released may drive the support shaft 6 to rotate so as to unfold the screen component 2. For another example, the second drive device may be a one-way rotating motor drive mechanism. When the screen component 2 is manually curled, the support shaft 6 may be driven by the one-way rotating motor drive mechanism to perform the second rotation, so as to unfold the screen component 2 from the support shaft 6.

In some embodiments, the drive device may include the first drive device and the second drive device at the same time. The first drive device is used to drive the support shaft 6 to perform the first rotation so as to curl the screen component 2 on the support shaft 6, and the second drive device is used to drive the support shaft 6 to perform the second rotation so as to unfold the screen component 2 from the support shaft 6. In some embodiments, the first drive device and the second drive device may be used separately as required. For example, when the screen component 2 is required to be developed, the second drive device may be activated, and the first drive device is deactivated, so as to unfold the screen component 2 from the support shaft 6. For another example, when the screen component 2 is required to be curled, the first drive device may be activated, and the second drive device is deactivated, so as to wind the screen component 2 on the support shaft 6.

In some embodiments, the drive device may include a third drive device, and the third drive device may drive the support shaft 6 to perform the first rotation and the second rotation, that is, the third drive device may be used to drive the support shaft 6 to perform curling and unfoldment of the screen component 2. For example, the third drive device may be a motor drive device. A forward rotation of the motor drive device may drive the support shaft 6 to perform the first rotation so as to achieve curling of the screen component 2, and the reverse rotation of the motor drive device may drive the support shaft 6 to perform the second rotation so as to achieve unfoldment of the screen component 2. In some embodiments, the flexible display device 200 may further include a curling auxiliary device 70. In some embodiments, the curling auxiliary device 70 may be used to maintain the screen component 2 in the curled state after the screen component 2 is curled. In some embodiments, the curling auxiliary device 70 may include, but is not limited to, a snap, a rope, a sleeve, a magnetic buckle and the like. In some embodiments, the curling auxiliary device 70 may be disposed according to the curled form of the flexible display device 200. In some embodiments, if the flexible display device 200 is in the uniaxial curled form, the curling auxiliary device 70 may be disposed at the end of the screen component 2 opposite to the storage device 7. In some embodiments, the curling auxiliary device 70 may include a snap, and the snap may be buckled on the storage device 7 after the screen component 2 is curled, so as to keep the screen component 2 curled. In some embodiments, if the flexible display device 200 is in the double-axis curled form, the curling auxiliary device 70 may be a connection structure separately disposed on two storage devices 7 (for example, a snap or magnetic buckle). After the screen component 2 is curled, the two storage devices 7 may be connected together through the connection structure, so as to keep the screen component 2 in the curled state.

Figure 6:
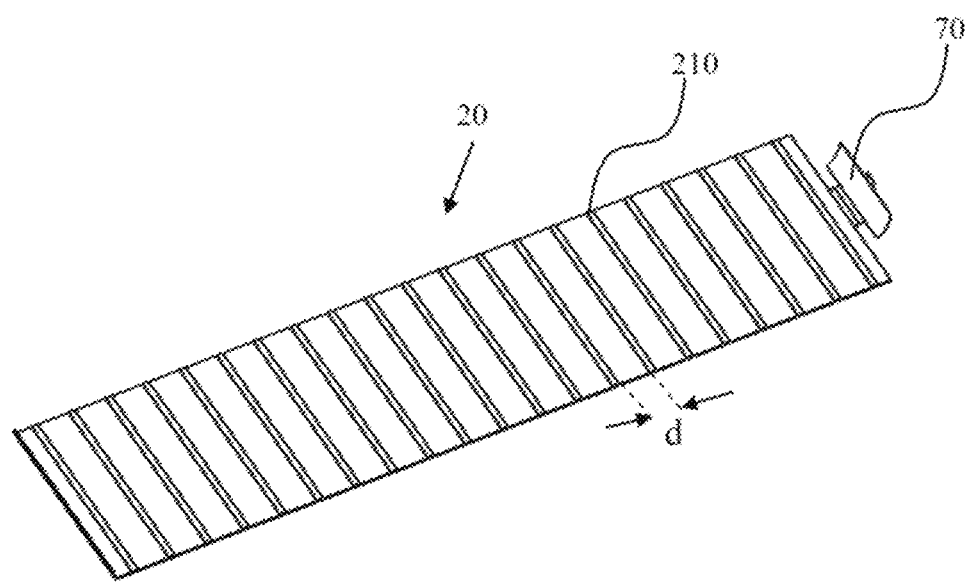
FIG. 6 is a schematic structural view of a support structure when a flexible display device is in a developed state shown according to some embodiments of the application.
Figure 7:
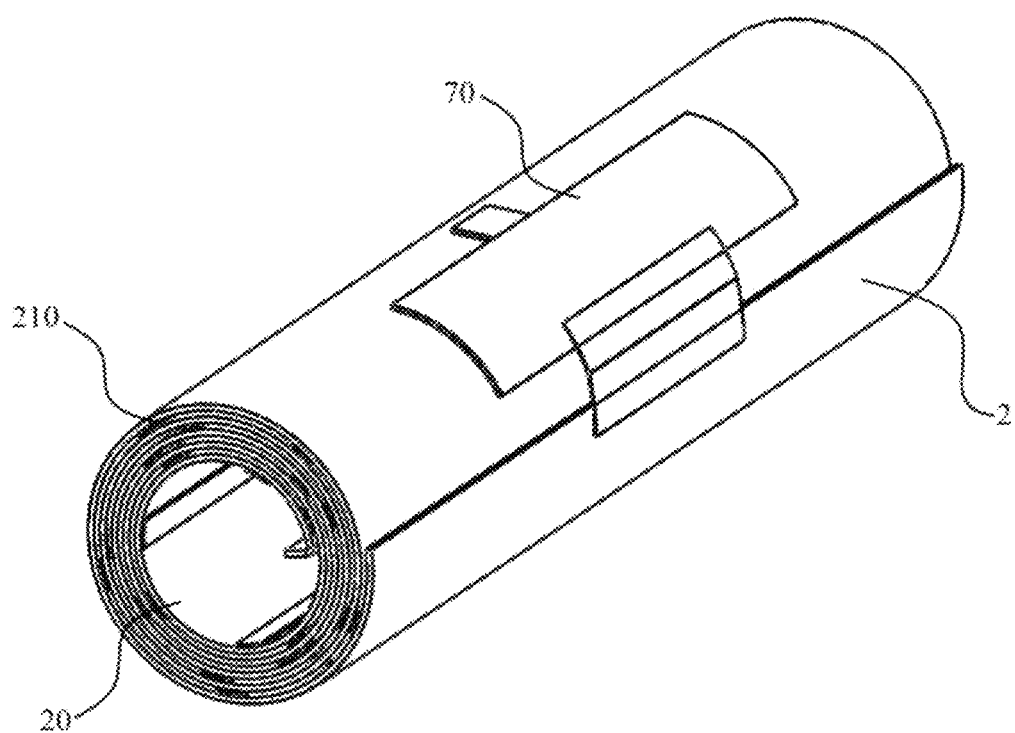
FIG. 7 is a schematic structural view of a support structure when a flexible display device is in a curled state shown according to some embodiments of the application.

In some embodiments, the flexible display device 200 may also include no storage device 7 and/or support shaft 6. As shown in FIGS. 6 and 7, the flexible display device 200 includes a screen component 2, a curling auxiliary device 70 connected to the screen component 2, and the flexible display device 200 does not include a support shaft 6 and a storage device 7. In the actual curling operation, the screen component 2 may be manually assisted to be curled around the starting edge, and after the curling is completed, the curling auxiliary device 70 may be used to assist in keeping the curled state. In some embodiments, the flexible display device 200 may also include no curling auxiliary device 70 shown in FIG. 6, and may be kept in the curled state by an additional holding element after the curling is completed, for example, is bundle with an additional rope to keep it in the curled state.

In some embodiments, the power interface 30 may be disposed on the storage device 7 and connected to the screen component 2. In some embodiments, the signal interface 40 may also be disposed on the storage device 7 and connected to the screen component 2. In some embodiments, when the flexible display device 200 include no storage device 7, the power interface and/or the signal interface may also be directly disposed at the screen body edge of the screen component 2 and connected to a certain layer of the screen component 2. For example, the power interface and/or the signal interface may be disposed on the module layer.

In some embodiments, the flexible display device may include a screen component 2 and a support structure 20 disposed on the screen component 2. The support structure 20 causes different stiffness of the flexible display device in the first direction and in the second direction. In one or more embodiments of the description, the stiffness of the flexible display device refers to the stiffness of the whole formed by combining the screen component 2 and the support structure 20 disposed thereon. In addition, in one or more embodiments of the description, the flexible display device may be additionally added with other constituent modules. Regardless of the type of the added constituent modules, it is still possible to determine, in such a flexible display device with additional constituent modules, the combination of the screen component 2 and the support structure 20, and then recognize that the stiffness of the combination is different in the first direction and the second direction.

In some embodiments, the flexible display device has a stiffness of 0.01GPa-100 GPa in the first direction 1001; in some embodiments, the flexible display device has a stiffness of 0.01 GPa-50 GPa in the first direction; in some embodiments, the flexible display device has a stiffness of 0.01 GPa-20GPa in the first direction; in some embodiments, the flexible display device has a stiffness of 0.01 GPa-10 GPa in the first direction; in some embodiments, the flexible display device has a stiffness of 0.01 GPa-5 GPa in the first direction; in some embodiments, the flexible display device has a stiffness of 0.01 GPa-1 GPa in the first direction; in some embodiments, the flexible display device has a stiffness of 0.05 GPa-10 GPa in the first direction; in some embodiments, the flexible display device has a stiffness of 0.05 GPa-5 GPa in the first direction; in some embodiments, the flexible display device has a stiffness of 0.05 GPa-1 GPa in the first direction; in some embodiments, the flexible display device has a stiffness of 0.01 GPa-10 GPa in the first direction; in some embodiments, the flexible display device has a stiffness of 0.01 GPa-5 GPa in the first direction; in some embodiments, the flexible display device has a stiffness of 0.01 GPa-1 GPa in the first direction; in some embodiments, the flexible display device has a stiffness of 0.05 GPa-10 GPa in the first direction; in some embodiments, the flexible display device has a stiffness of 0.05 GPa-5 GPa in the first direction; in some embodiments, the flexible display device has a stiffness of 0.05 GPa-1 GPa in the first direction; in some embodiments, the flexible display device has a stiffness of 0.1 GPa-10 GPa in the first direction; in some embodiments, the flexible display device has a stiffness of 0.1 GPa-5 GPa in the first direction; in some embodiments, the flexible display device has a stiffness of 0.1 GPa-1 GPa in the first direction; in some embodiments, the flexible display device has a stiffness of 0.5 GPa-10 GPa in the first direction; in some embodiments, the flexible display device has a stiffness of 0.5 GPa-8 GPa in the first direction; in some embodiments, the flexible display device has a stiffness of 0.5 GPa-6 GPa in the first direction; in some embodiments, the flexible display device has a stiffness of 0.5 GPa-5 GPa in the first direction; in some embodiments, the flexible display device has a stiffness of 0.5 GPa-1 GPa in the first direction; in some embodiments, the flexible display device has a stiffness of 1 GPa-10 GPa in the first direction; in some embodiments, the flexible display device has a stiffness of 1 GPa-9 GPa in the first direction; in some embodiments, the flexible display device has a stiffness of 2 GPa-8 GPa in the first direction; in some embodiments, the flexible display device has a stiffness of 2 GPa-7 GPa in the first direction; in some embodiments, the flexible display device has a stiffness of 2.5 GPa-6.5 GPa in the first direction; in some embodiments, the flexible display device has a stiffness of 3 GPa-6 GPa in the first direction; in some embodiments, the flexible display device has a stiffness of 3.5 GPa-6 GPa in the first direction; in some embodiments, the flexible display device has a stiffness of 4 GPa-5 GPa in the first direction.

In some embodiments, the stiffness of the flexible display device in the second direction may be any numerical value between 10 GPa and 1000 GPa; in some embodiments, the stiffness of the flexible display device in the second direction may be any numerical value between 10 GPa and 900 GPa; in some embodiments, the stiffness of the flexible display device in the second direction may be any numerical value between 15 GPa and 850 GPa; in some embodiments, the stiffness of the flexible display device in the second direction may be any numerical value between 20 GPa and 800 GPa; in some embodiments, the stiffness of the flexible display device in the second direction may be any numerical value between 10 GPa and 750 GPa; in some embodiments, the stiffness of the flexible display device in the second direction may be any numerical value between 10 GPa and 700 Gpa; in some embodiments, the stiffness of the flexible display device in the second direction may be any numerical value between 10 GPa and 650 GPa; in some embodiments, the stiffness of the flexible display device in the second direction may be any numerical value between 10 GPa and 600 GPa; in some embodiments, the stiffness of the flexible display device in the second direction may be any numerical value between 10 GPa and 500 Gpa; in some embodiments, the stiffness of the flexible display device in the second direction may be any numerical value between 10 GPa and 400 GPa; in some embodiments, the stiffness of the flexible display device in the second direction may be any numerical value between 10 GPa and 350 GPa; in some embodiments, the stiffness of the flexible display device in the second direction may be any numerical value between 10 GPa and 300 GPa; in some embodiments, the stiffness of the flexible display device in the second direction may be any numerical value between 20 GPa and 300 GPa; in some embodiments, the stiffness of the flexible display device in the second direction may be any numerical value between 30 GPa and 300 GPa; in some embodiments, the stiffness of the flexible display device in the second direction may be any numerical value between 40 GPa and 300 GPa; in some embodiments, the stiffness of the flexible display device in the second direction may be any numerical value between 50 GPa and 250 GPa; in some embodiments, the stiffness of the flexible display device in the second direction may be any numerical value between 60 GPa and 220 GPa; in some embodiments, the stiffness of the flexible display device in the second direction may be any numerical value between 80 GPa and 200 GPa; in some embodiments, the stiffness of the flexible display device in the second direction may be any numerical value between 100 GPa and 200 GPa; in some embodiments, the stiffness of the flexible display device in the second direction may be any numerical value between 120 GPa and 180 GPa.

In some embodiments, the flexible display device has a stiffness difference of 0-3% in the second direction 1002, and the stiffness difference may be interpreted as a difference ratio of the stiffness values at any two position points of the flexible display device in the second direction 1002 (i.e., the connection line between the two position points is parallel to the second direction 1002). In some embodiments, the flexible display device has a stiffness difference of 0-2.5% in the second direction 1002; in some embodiments, the flexible display device has a stiffness difference of 0-2% in the second direction 1002; in some embodiments, the flexible display device has a stiffness difference of 0.5%-2% in the second direction 1002; in some embodiments, the flexible display device has a stiffness difference of 1%-2% in the second direction 1002.

In some embodiments, a ratio of the stiffness of the flexible display device in the second direction to the stiffness in the first direction is greater than 1; preferably, the ratio is greater than 100. In some embodiments, the ratio may be 1-3000; in some embodiments, the ratio may be 10-3000; in some embodiments, the ratio may be 20-3000; in some embodiments, the ratio may be 25-3000; in some embodiments, the ratio may be 30-3000; in some embodiments, the ratio may be 35-3000; in some embodiments, the ratio may be 40-3000; in some embodiments, the ratio may be 45-3000; in some embodiments, the ratio may be 50-3000; in some embodiments, the ratio may be 60-3000; in some embodiments, the ratio may be 70-3000; in some embodiments, the ratio may be 80-3000; in some embodiments, the ratio may be 90-3000; in some embodiments, the ratio may be 100-3000; in some embodiments, the ratio may be 1000-3000.

In some embodiments, referring to FIG. 6, the support structure 20 may include a plurality of support members 210. In some embodiments, referring to FIG. 6, the support members 210 may be disposed on the back surface of the screen component 2 at intervals with a certain distribution rule in the first direction 1001. In some embodiments, the distribution rule of the support members 210 may be a uniform interval distribution. In some embodiments, the distribution rule of the support members 210 may also be a gradual interval distribution. Refer to the other sections of the description for more explanations regarding the distribution rule of the support members 210. In some embodiments, if the back surface of the screen component 2 is provided with a plurality of support members 210 at intervals, a flexible polymer material may be filled between adjacent support members 210. In some embodiments, the flexible polymer material may include, but is not limited to, silica gel, rubber, hydrogel and the like. In some embodiments, the stiffness of the flexible polymer material is less than the stiffness of the support members 210. In some embodiments, the stiffness of the flexible polymer material may be 0.1 GPa-30 GPa; preferably, the stiffness is 0.1 GPa-25 GPa; more preferably, the stiffness is 0.1 GPa-10 GPa.

In some embodiments, each support member 210 of the support structure 20 may be disposed parallel to the second direction 1002. In some embodiments, each support member 210 of the support structure 20 may not be strictly parallel to the second direction 1002, but have a certain deviation angle. In some embodiments, the deviation angle range between each support member 210 and the second direction 1002 may be 0°-5°; preferably, the deviation angle range may be 0.1°-3°; preferably, the deviation angle range may be 0.1°-2.5°; preferably, the deviation angle range may be 0.15°-2°; preferably, the deviation angle range may be 0.1°-2°; preferably, the deviation angle range may be 0.1°-1.5°; preferably, the deviation angle range may be 0.1°-1°; preferably, the deviation angle range may be 0.1°-0.9°; preferably, the deviation angle range may be 0.1°-0.8°; preferably, the deviation angle range may be 0.1°-0.7°; preferably, the deviation angle range may be 0.1°-0.6°; preferably, the deviation angle range may be 0.1°-0.5°. In some embodiments, the various support members 210 of the support structure 20 may also be disposed parallel to each other. In some embodiments, each support member 210 of the support structure 20 may not be strictly parallel to each other, but have a certain deviation angle, and the allowable deviation angle thereof may be 0°-10°; preferably, the deviation angle range may be 0.2°-6°; preferably, the deviation angle range may be 0.2°-5°; preferably, the deviation angle range may be 0.3°-4°; preferably, the deviation angle range may be 0.2°-4°; preferably, the deviation angle range may be 0.2°-3°; preferably, the deviation angle range may be 0.2°-2°; preferably, the deviation angle range may be 0.2°-1.8°; preferably, the deviation angle range may be 0.2°-1.6°; preferably, the deviation angle range may be 0.2°-1.4°; preferably, the deviation angle range may be 0.2°-1.2°; preferably, the deviation angle range may be 0.2°-1°.

In some embodiments, the support members 210 may be abutting-joint to the back surface of the screen component 2 in the second direction 1002. In some embodiments, the width size of the support member 210 in the first direction 1001 is 10 mm-300 mm; preferably, the size is 10 mm-200 mm; preferably, the size is 10 mm-150 mm; preferably, the size is 10 mm-100 mm; preferably, the size is 10 mm-50 mm; more preferably, the size is 10 mm-20 mm. In some embodiments, the thickness size of the support member 210 is 10 mm-200 mm; preferably, the size is 10 mm-180 mm; preferably, the size is 10 mm-150 mm; preferably, the size is 10 mm-100 mm; preferably, the size is 10 mm-50 mm; more preferably, the size is 30 mm-50 mm.

In some embodiments, the ratio of the size of the support member 210 in the second direction to the size of the screen component 2 in the second direction 1002 may be 0.8-1.1; preferably, may be 0.97; more preferably, may be 0.98. In some other embodiments, the size difference between the support member 210 and the screen component 2 in the second direction 1002 may be 0.5 cm-2 cm, and the difference may be determined according to the application scenario of the flexible display device 200. For example, when the flexible display device 200 is used for a small-sized tablet phone, the difference may be 0.5 cm. For another example, when the flexible display device 200 is used for a large-sized television, the difference may be 2 cm. For yet another example, when the flexible display device 200 is used for a personal tablet computer, the difference may be 0.8 cm. For further another example, when the flexible display device 200 is used for a personal notebook computer, the difference may be 1 cm.

In some embodiments, in a certain linear direction parallel to the second direction, the support member 210 may include one integral support member, or may also include a plurality of support members distributed in the linear direction at intervals.

In some embodiments, the stiffness of the flexible display device in the first direction 1001 may be determined by the distribution density of the support members 210 in the first direction 1001. The greater the distribution density of the support members 210 in a certain region in the first direction 1001 is, the higher the stiffness of the flexible display device in this region in the first direction 1001 is, and conversely, the smaller the distribution density of the support members in a certain region is, the smaller the stiffness of the flexible display device in the region is.

In some embodiments, the support members 210 may be uniformly distributed in the first direction 1001, that is, the distribution density at each position in the first direction is the same (as shown in FIG. 6). In some embodiments, the support members may also be distributed gradually in the first direction 1001, that is, the distribution density is different at different positions in the first direction. In some embodiments, the support members may also be distributed in steps in the first direction 1001. Specifically, the support members are divided into two or more regions in the first direction, and in the two or more regions, the distribution density in the same region is the same, and the distribution density in different regions is different. In some embodiments, the distribution density of the support members 210 may be reflected by the ratio of the size of the support member 210 in the first direction to the size of the gap between two adjacent support members 210 in the first direction. The size of the gap between two adjacent support members 210 in the first direction is the separation distance d between the two adjacent support members 210 (as shown in FIG. 6). Further, referring to FIG. 6, when the width of the support member 210 is within a certain range, the smaller the separation distance d between two adjacent support members 210 is, the higher the distribution density of the support members 210 is. Conversely, the larger the separation distanced between two adjacent support members 210 is, the lower the distribution density of the support members 210 is.

In some embodiments, the ratio of the size of the support member 210 in the first direction to the size of the gap adjacent to the support member 210 in the first direction may be 1:10-1:1; preferably, the ratio may be 1:9-1:1; preferably, the ratio may be 1:8-1:1; preferably, the ratio may be 1:7-1:1; preferably, the ratio may be 1:6-1:1; more preferably, the ratio may be 1:5-1:1.

Figure 11:
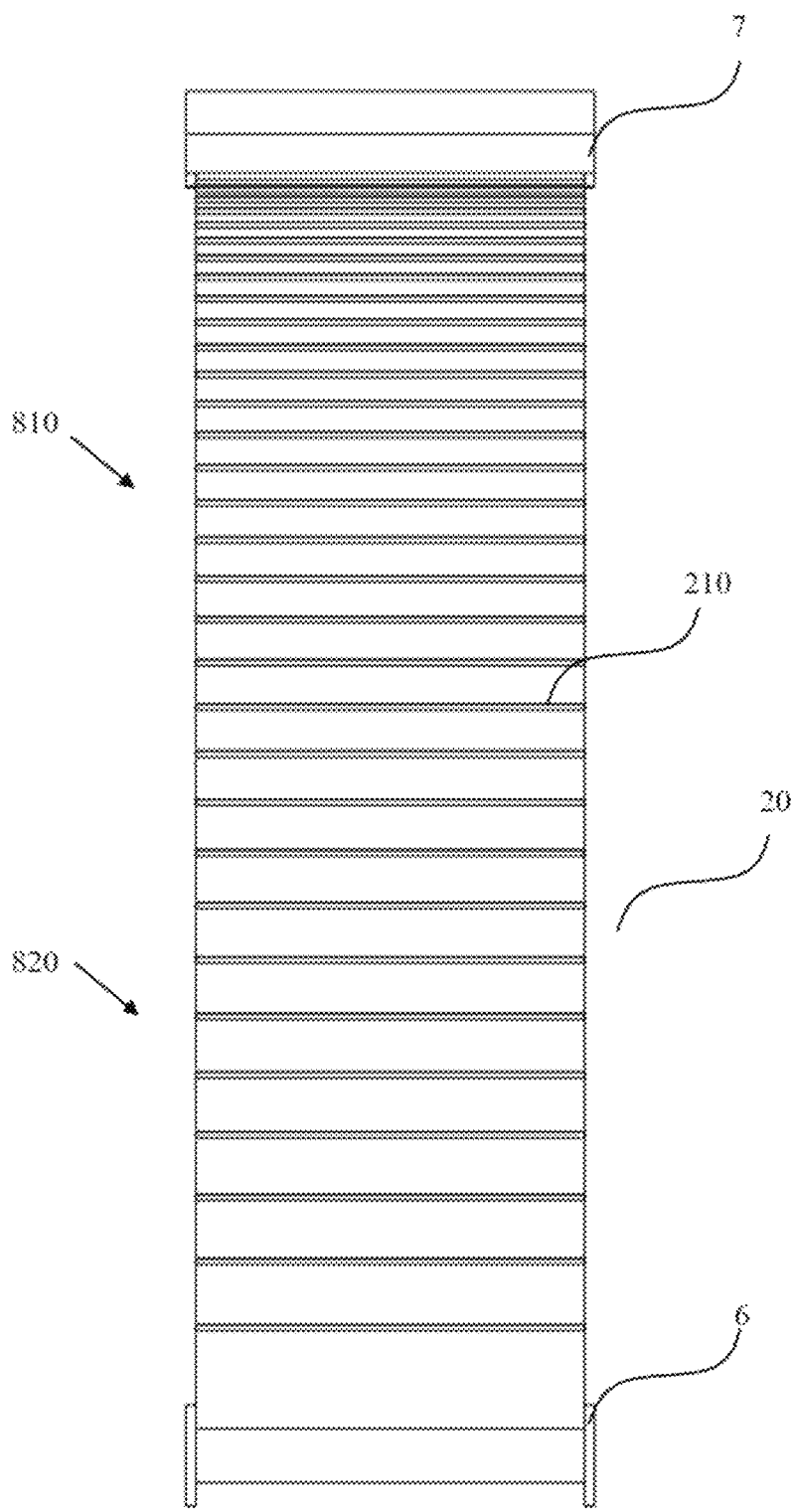
FIG. 11 is a schematic view of support member distribution when a flexible display device is in a uniaxial curled form shown according to the embodiments of the application.

In some embodiments, the flexible display device 200 may be in a uniaxial curled form, referring to FIG. 11, and the support members 210 may be distributed at gradual intervals in the first direction 1001. In some embodiments, the distribution density of the support members 210 is lower at the end close to the support shaft 6 and higher at the end away from the support shaft 6. In some embodiments, the ratio of the size of the support member 210 in the first direction to the size of the gap adjacent to the support member 210 in the first direction may be 1:10-1:1; preferably, the ratio may be 1:9-1:1; preferably, the ratio may be 1:8-1:1; preferably, the ratio may be 1:7-1:1; preferably, the ratio may be 1:6-1:1; more preferably, the ratio may be 1:5-1:1.

Figure 12:
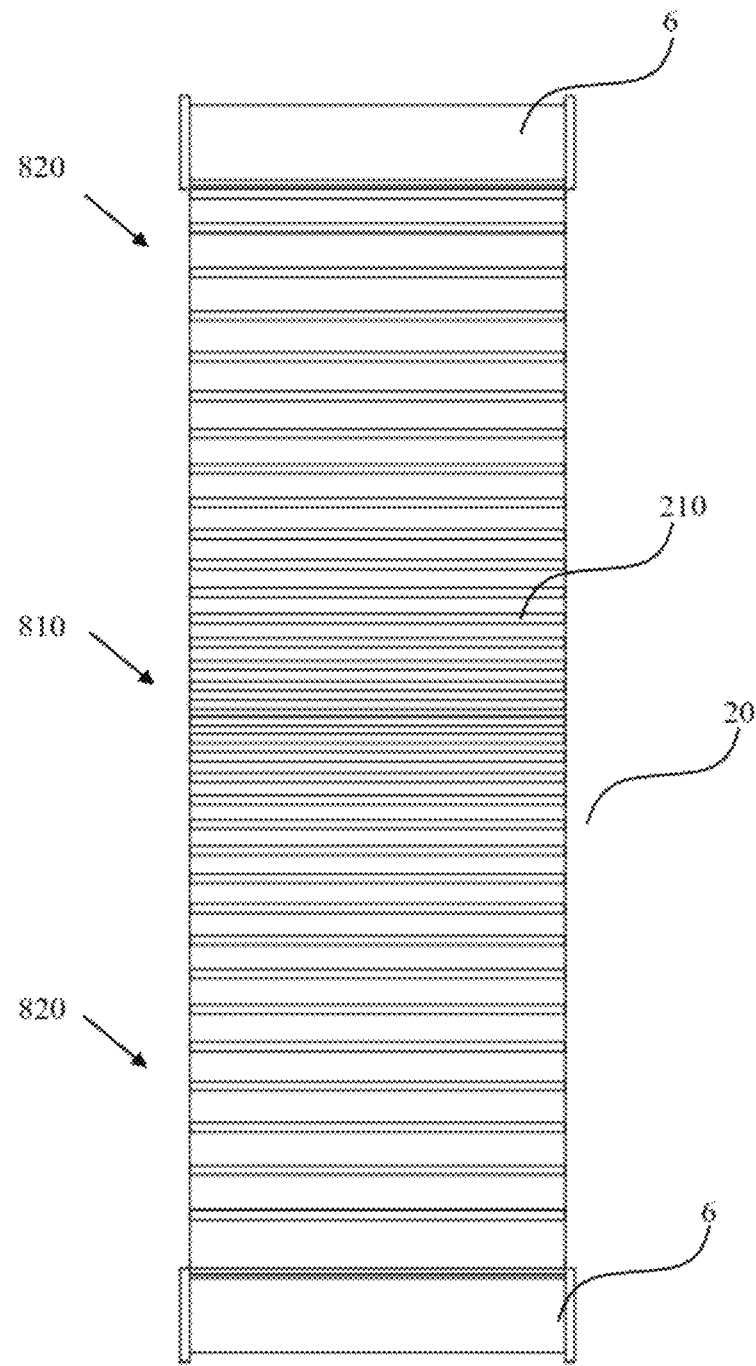
FIG. 12 is a schematic view of support member distribution when a flexible display device is in a double-axis curled form shown according to the embodiments of the application.

In some embodiments, the flexible display device 200 may be in a double-axis curled form, referring to FIG. 12, and the support members 210 may be distributed at gradual intervals in the first direction 1001 from the center to both sides. In some embodiments, the distribution density of the support members 210 is lower in the regions close to the support shafts 6 at both sides and higher in the region corresponding to the center of the screen component 2. In some embodiments, the ratio of the size of the support member 210 in the first direction to the size of the gap adjacent to the support member 210 in the first direction may be 1:10-1:1; preferably, the ratio may be 1:9-1:1; preferably, the ratio may be 1:8-1:1; preferably, the ratio may be 1:7-1:1; preferably, the ratio may be 1:6-1:1; further preferably, the ratio may be 1:5-1:1.

In some embodiments, the stiffness of the support member 210 may be 10 GPa-1000 GPa; in some embodiments, the stiffness of the support member 210 may be 10 GPa-900 GPa; in some embodiments, the stiffness of the support member 210 may be 10 GPa-800 GPa; in some embodiments, the stiffness of the support member 210 may be 10 GPa-700 GPa; in some embodiments, the stiffness of the support member 210 may be 10 GPa-600 GPa; in some embodiments, the stiffness of the support member 210 may be 10 GPa-500 GPa; in some embodiments, the stiffness of the support member 210 may be 10 GPa-400 GPa; in some embodiments, the stiffness of the support member 210 may be 10 GPa-300 GPa; in some embodiments, the stiffness of the support member 210 may be 10 GPa-210 GPa; in some embodiments, the stiffness of the support member 210 may be 10 GPa-200 GPa; in some embodiments, the stiffness of the support member 210 may be 10 GPa-150 GPa; in some embodiments, the stiffness of the support member 210 may be 10 GPa-110 GPa; in some embodiments, the stiffness of the support member 210 may be 20 GPa-120 GPa; in some embodiments, the stiffness of the support member 210 may be 30 GPa-100 GPa; in some embodiments, the stiffness of the support member 210 may be 40 GPa-90GPa; in some embodiments, the stiffness of the support member 210 may be 50 GPa-80 GPa; in some embodiments, the stiffness of the support member 210 may be 70 GPa-210 GPa; in some embodiments, the stiffness of the support member 210 may be 70 GPa or 210 GPa.

In some embodiments, the material of the support member 210 may include, but is not limited to, at least one of aluminium or aluminium alloy, titanium or titanium alloy, steel, glass, carbon fiber, glass fiber and the like. In some embodiments, the material of the support member 210 may also be any other material capable of reaching a corresponding stiffness range, which is not limited in the description. For example, the material of the support member 210 may further include silicon oxide or silicon nitride.

In some embodiments, the shape of the support member 210 may include a rectangular block or a waisted block or a trapezoidal block. In some embodiments, the support member 210 is a rectangular block support member. In some embodiments, the long sides of the rectangle in the rectangular block support member may be parallel to the second direction 1002, and the width of the rectangle in the rectangular block support member may be parallel to the first direction 1001. In some embodiments, the support member 210 is a waisted block support member. In some embodiments, the straight sides of the waist in the waisted block support member may be parallel to the second direction 1002. It should be noted that "parallel" in the description may be interpreted as to be parallel within a certain deviation angle range, and reference may be made to the description of the deviation angle above for the specific numerical value of the deviation angle, which will not be repeated here.

In some embodiments, when the screen component 2 is developed, further referring to FIG. 6, the support members 210 may support the screen component 2 from multiple positions on the back surface of the screen component 2, thereby changing the stiffness of the flexible display device in the first direction 1001 and in the second direction 1002.

In some embodiments, when the screen component 2 is curled, further referring to FIG. 7, since the support members 210 are distributed on the back surface of the screen component 2 at intervals, the gaps between the support members 210 enable the support members 210 to be curled together with the screen component 2 for storage. In some embodiments, after the screen component 2 is curled, the screen component 2 may be further separated by the support members 210 to reduce friction which may be generated when the screen component 2 is curled.

In some embodiments, the ratio of the size of the support member 210 in the first direction to the length of the gap adjacent to the support member in the first direction 1001 may be any numerical value between 1:10 and 1:1; in some embodiments, the ratio may be any numerical value between 1:8 and 1:1; in some embodiments, the ratio may be any numerical value between 1:6 and 1:2; in some embodiments, the ratio may be any numerical value between 1:5 and 1:4. In some embodiments, the ratio varies gradually from a numerical value of 1:1 in the region close to the support shaft 6 to 1:10 in the region away from the support shaft 6. Herein, when the flexible display device is in the uniaxial curled form, the region away from the support shaft may be the side end of the screen component away from the support shaft; when the flexible display device is in the double-axis curled form, the region away from the support shaft may be the middle region of the screen component in the first direction. In some embodiments, the ratio varies gradually from a numerical value of 1:1 in the region close to the support shaft 6 to 1:10 in the middle region of the screen component 2, and then continues to vary gradually to 1:1 in the region away from the support shaft 6. In some embodiments, the ratio varies gradually from a numerical value of 1:1 in the region close to the support shaft 6 to 1:5 in the middle region of the screen component 2, and then continues to vary gradually to 1:10 in the region away from the support shaft 6.

In some embodiments, the support members 210 may be distributed at different positions relative to the screen component 2 in the first direction 1001, so that the stiffness of the flexible display device is different in the first direction 1001. In some embodiments, referring to FIGS. 9 to 12, the screen component 2 may include a first region 810 and a second region 820 distributed in the first direction 1001. In some embodiments, the stiffness requirement of the first region 810 in the first direction 1001 is greater than the stiffness requirement of the second region 820 in the first direction 1001.

In some embodiments, during curling and storing the screen component 2, the closer to the support shaft 6 of the flexible display device 200 a region is, the smaller the curled radius is, the greater the curled amplitude is, and the easier it is to rebound. Therefore, the stiffness of the flexible display device is smaller in the region close to the support shaft 6, and the stiffness of the flexible display device is larger in the region away from the support shaft 6, that is, the first region 810 may be the region away from the support shaft 6 in the first direction, and the second region 820 may be the region close to the support shaft 6.

Figure 9:
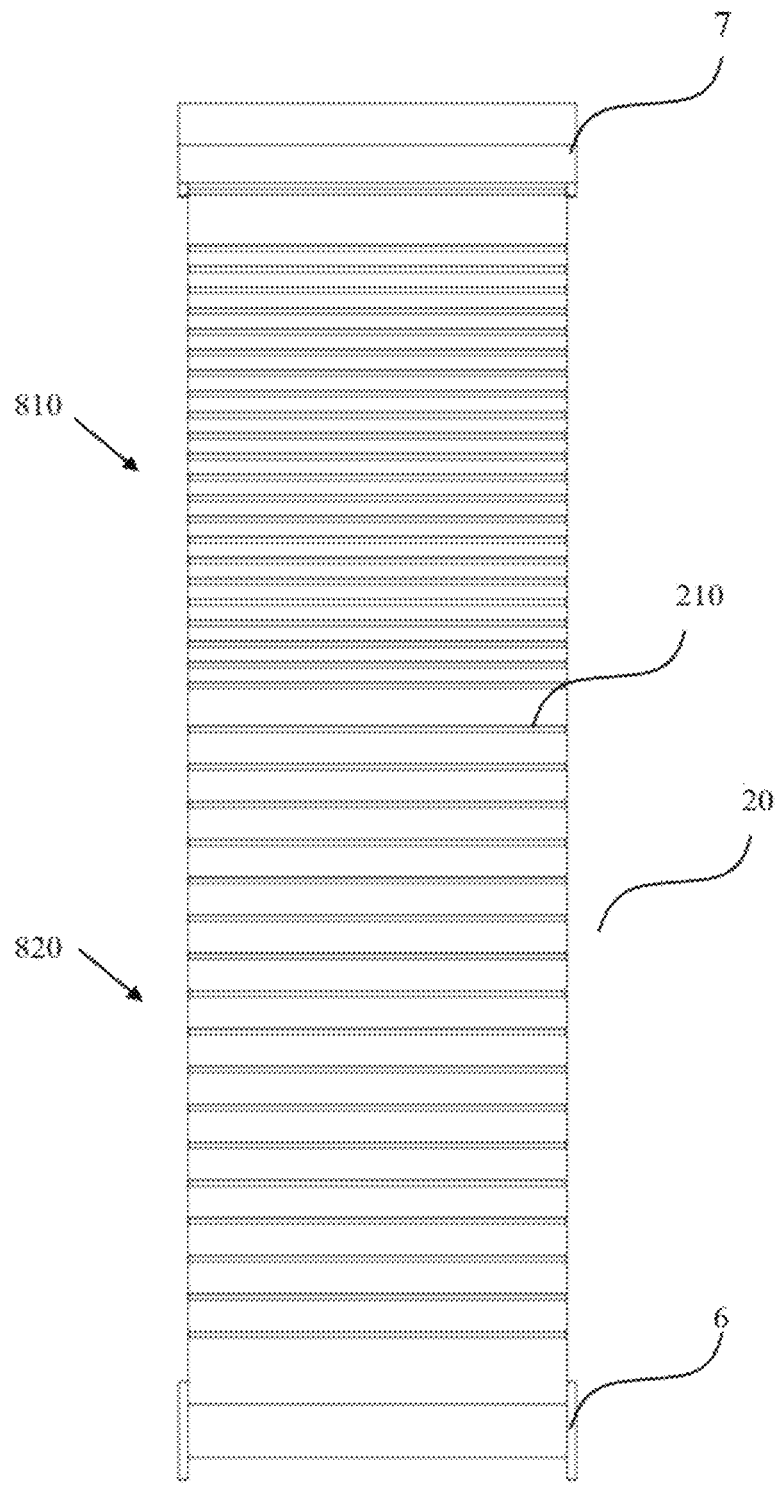
FIG. 9 is a schematic view of support member distribution when a flexible display device is in a uniaxial curled form shown according to the embodiments of the application.
Figure 10:
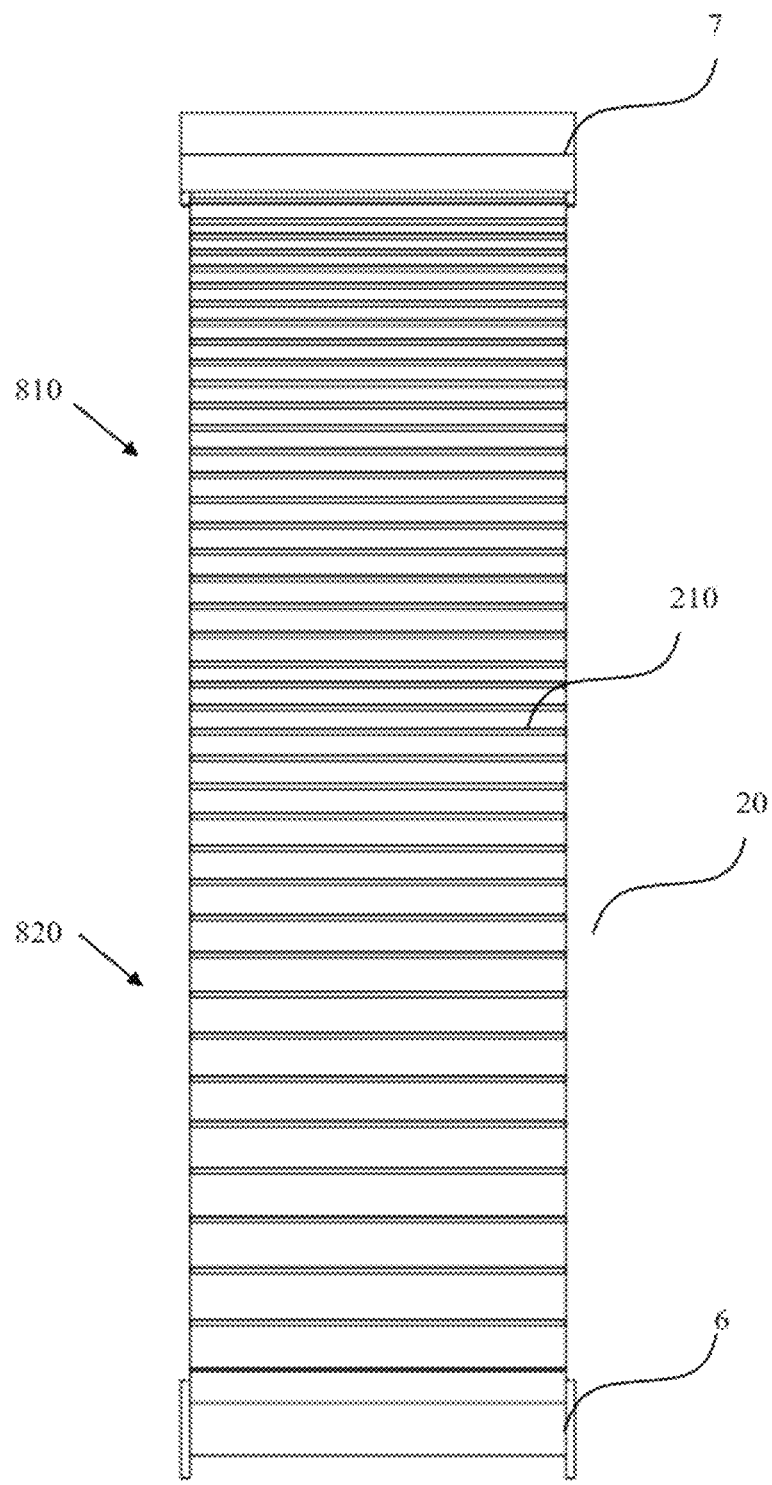
FIG. 10 is a schematic view of support member distribution when a flexible display device is in a uniaxial curled form shown according to the embodiments of the application.

In some embodiments, if the flexible display device 200 is in the uniaxial curled form, referring to FIGS. 9 to 11, the first region 810 may be located at the side away from the support shaft 6, and the second region 820 may be located at the side close to the support shaft 6. Correspondingly, in some embodiments, the ratio of the width of the first region 810 in the first direction 1001 to the width of the screen component 2 in the first direction 1001 may be 0.2-0.8; preferably, may be 0.3-0.7; more preferably, may be 0.4-0.6. In some embodiments, the ratio of the width of the second region 820 in the first direction 1001 to the width of the screen component 2 in the first direction 1001 may be 0.2-08; preferably, may be 0.3-0.7; more preferably, may be 0.4-0.6. In some embodiments, if the flexible display device 200 is in the double-axis curled form, the first region 810 may be located in the middle region of the screen component 2, and the second region 820 may be located in two side regions of the screen component 2. In some embodiments, the ratio of the width of the first region 810 in the first direction 1001 to the width of the screen component 2 in the first direction 1001 may be 0.2-0.6; preferably, may be 0.2-0.4; more preferably, may be 0.3-0.4. In some embodiments, the width of the second region 820 in the first direction 1001 may be 0.2-0.4; preferably, may be 0.3-0.4; more preferably, may be 0.3-0.35.

In some embodiments, the density distribution of the support members 210 corresponding to the first region 810 may be a first density distribution, and the density distribution corresponding to the second region 820 may be a second density distribution. Here the first density distribution is greater than the second density distribution.

In some embodiments, the first density distribution may be a uniform distribution. In some embodiments, the first density distribution may also be a gradual distribution. In some embodiments, the second density distribution may be a uniform distribution. In some embodiments, the second density distribution may also be a gradual distribution.

Here, the first density distribution and the second distribution density may be reflected by the ratio of the size of the support member in the first direction to the size of the gap adjacent to the support member in the first direction. For ease of description, in the first region, the ratio of the size of the support member 210 in the first direction to the size of the adjacent gap thereof in the first direction is referred to as a first ratio; in the second region, the ratio of the size of the support member 210 in the first direction to the size of the adjacent gap thereof in the first direction is referred to as a second ratio.

In the following, the density distribution situation of the support members 210 corresponding to different regions will be described in the case of the flexible display device 200 in the uniaxial curled form.

As an example, in some embodiments, referring to FIG. 9, the first density distribution may be a uniform distribution, while the second density distribution may also be a uniform distribution, and the distribution densities of the two are different. In some embodiments, the first density distribution may be a uniform distribution, and the second density distribution may be a gradual distribution. In some embodiments, the first density distribution may be a gradual distribution, and the second density distribution may be a uniform distribution.

In some embodiments, the first ratio may be any numerical value between 1:5 and 1:1; preferably, may be any numerical value between 1:4 and 1:1; more preferably, may be any numerical value between 1:3 and 1:1. The second ratio may be any numerical value between 1:10 and 1:5; preferably, may be any numerical value between 1:9 and 1:5; more preferably, may be any numerical value between 1:8 and 1:5.

As an example, in some embodiments, the first density distribution may be a gradual distribution, and the second density distribution may also be a gradual distribution. In some embodiments, referring to FIG. 11, the gradual rule of the first density distribution may be the same as the gradual rule of the second density distribution. At this time, the first ratio may be set gradually within the range of 1:5 to 1:1; preferably, the first ratio may be set gradually within the range of 1:4 to 1:1; more preferably, may be set gradually within the range of 1:3 to 1:1. The second ratio may be set gradually within the range of 1:10 to 1:5; preferably, may be set gradually within the range of 1:9 to 1:5; more preferably, may be set gradually within the range of 1:8 to 1:5. In some embodiments, the gradual rules for the first ratio and the second ratio may include, but is not limited to, arithmetic distribution, geometric distribution, random distribution, normal distribution, Poisson distribution, exponential distribution, binomial distribution, random distribution and the like.

In some embodiments, the gradual rules for the first ratio and the second ratio may be the same or different. Referring to FIG. 10, the gradual rule for the first ratio is different from the gradual rule for the second ratio.

In the following, the density distribution situation of the support members 210 corresponding to different regions will be described in the case of the flexible display device 200 in the double-axis curled form.

As an example, in some embodiments, the first density distribution may be a uniform distribution, and the second density distribution may also be a gradual distribution. The first ratio corresponding to the first density distribution may be any numerical value between 1:3 and 1:1; preferably, may be any numerical value between 1:3 and 1:5; more preferably, may be any numerical value between 1:3 and 1:2. The second ratio corresponding to the second density distribution may be set gradually within the range of 1:10-1:3; preferably, may be set gradually within the range of 1:9-1:3; more preferably, may be set gradually within the range of 1:8-1:3. The gradual rule of the second ratio may include, but is not limited to, arithmetic distribution, geometric distribution, random distribution, normal distribution, Poisson distribution, exponential distribution, binomial distribution, random distribution and the like.

As an example, in some embodiments, the first density distribution may be a gradual distribution, and the second density distribution may be a uniform distribution. The first ratio corresponding to the first density distribution may be set gradually within the range of 1:3-1:1; preferably, may be set gradually within the range of 1:3-1:5; more preferably, may be set gradually within the range of 1:3-1:2. The gradual rule of the first ratio may include, but is not limited to, arithmetic distribution, geometric distribution, random distribution, normal distribution, Poisson distribution, exponential distribution, binomial distribution, random distribution and the like. The second ratio corresponding to the second density distribution may be any numerical value between 1:10 and 1:3; preferably, may be any numerical value between 1:9 and 1:3; more preferably, may be any numerical value between 1:8 and 1:3.

As an example, in some embodiments, referring to FIG. 12, the first density distribution may be a gradual distribution, and the second density distribution may also be a gradual distribution. In some embodiments, the gradual rules for the two may be the same. In some embodiments, the gradual rules for the two may also be different. The second ratio corresponding to the first density distribution may be set gradually within the range of 1:3-1:1; preferably, may be set gradually within the range of 1:3-1:5; more preferably, may be set gradually within the range of 1:3 to 1:2. The distribution density of the second density distribution may be set gradually within the range of 1:10-1:3; preferably, may be set gradually within the range of 1:9-1:3; more preferably, may be set gradually within the range of 1:8-1:3. The gradual rules of the first ratio and the second ratio may include, but is not limited to, arithmetic distribution, geometric distribution, random distribution, normal distribution, Poisson distribution, exponential distribution, binomial distribution, random distribution and the like.

Figure 8A:
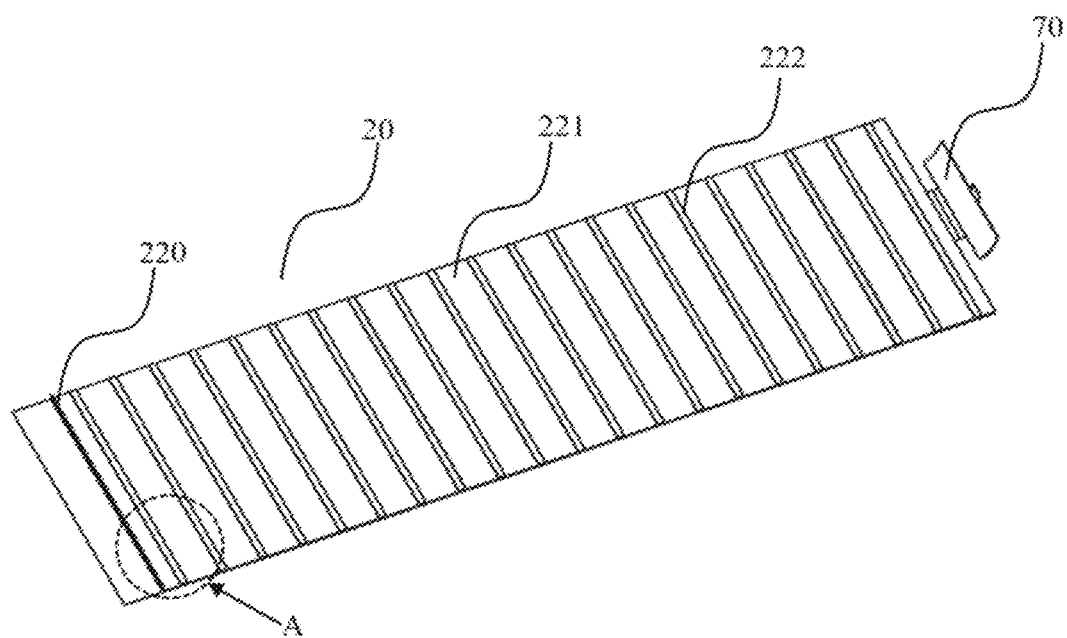
FIG. 8A is a schematic structural view of a support structure when a flexible display device is in a developed state shown according to some further embodiments of the application.
Figure 8B:
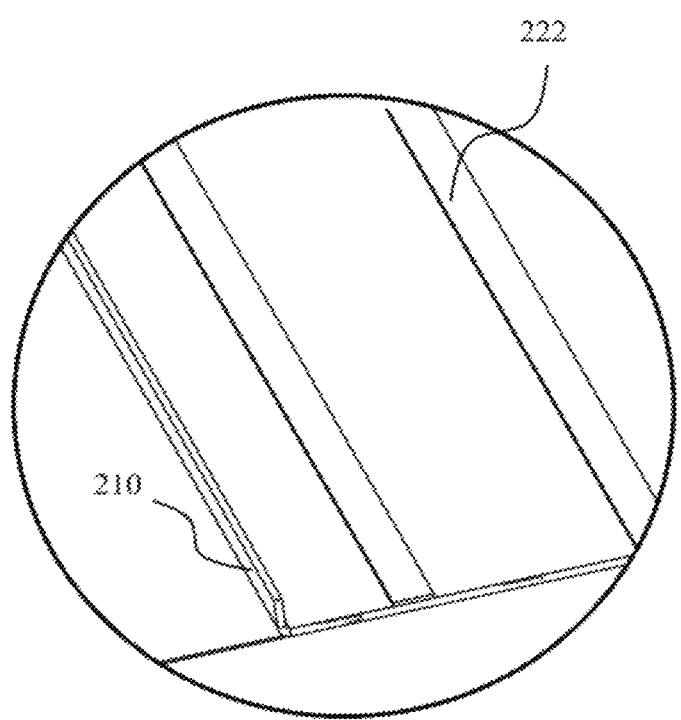
FIG. 8B is a partial enlarged view of a region A in FIG. 8A according to the application.

In some embodiments, referring to FIGS. 8A, 8B and 9, the support structure 20 may include a first support member, i.e., a support membrane 220. In some embodiments, the support membrane 220 may include a first portion 221 having a first stiffness and a second portion 222 having a second stiffness, where the second stiffness is greater than the first stiffness. In some embodiments, the first stiffness may be 0.001 GPa-10 GPa; preferably, the stiffness is 0.001 GPa-5 GPa; more preferably, the stiffness is 0.001 GPa-1 GPa. In some embodiments, the second stiffness may be 10 GPa-300 GPa; preferably, the stiffness is 10 GPa-280 GPa; preferably, the stiffness is 50 GPa-280 GPa; more preferably, the stiffness is 100 GPa-280 GPa.

In some embodiments, the first portion 221 of the support membrane 220 may include a first material. In some embodiments, the first material may include, but is not limited to, polyimide (PI) material, polyethylene terephthalate (PET) material and the like. In some embodiments, the second portion 222 of the support membrane 220 may include a second material. In some embodiments, the second material may include metal material including, but not limited to, titanium, steel, nickel, aluminum, copper and the like. In some embodiments, the second material may further include silicon oxide or silicon nitride and the like. In some embodiments, the first material may include polyimide (PI) material, polyethylene terephthalate (PET) material and the like. In some embodiments, the second material may also be flexible polymeric material. In some embodiments, the flexible polymer material may include, but is not limited to, silica gel, rubber, hydrogel and the like. In some embodiments, the stiffness of the second material is greater than the stiffness of the first material. In some embodiments, the stiffness of the first material may be 0.001 GPa-10 GPa; preferably, the stiffness is 0.001 GPa-5 GPa; more preferably, the stiffness is 0.001 GPa-1 GPa. In some embodiments, the stiffness of the second material may be 10 GPa-300 GPa; preferably, the stiffness is 10 GPA-280 GPa; preferably, the stiffness is 50 GPa-280 GPa; preferably, the stiffness is 50 GPa-200 GPa; more preferably, the stiffness is 50 GPa-100 GPa. In some embodiments, the support membrane 220 may be prepared all by the first material, and subsequently, by doping a specific region with the second material, the support membrane 220 may be formed with the first portion 221 and the second portion 222 with different stiffness described above in the corresponding region.

The distribution density of the second portion 222 in the first direction 1001 may be set with reference to the distribution density of the support members 210 in one or more of the foregoing embodiments. As an example, the ratio of the size of the second portion 222 in the first direction corresponding to the distribution density of the second portion 222 to the size of the adjacent gap thereof in the first direction may be 1:10-1:1; preferably, the ratio may be 1:9-1:1; preferably, the ratio may be 1:8-1:1; preferably, the ratio may be 1:7-1:1; preferably, the ratio may be 1:6-1:1; more preferably, the ratio may be 1:5-1:1. The ratio may be set uniformly by selecting any numerical value within the above ratio range, or may be set variably within the above ratio range, for example, set gradually. Here, for the ratio and the variation rule (for example, the gradual rule) of the ratio, reference may be made to the relevant description of the support members 210 in the description.

In some embodiments, the thickness of the first portion 221 may be 1 mm-4 mm; preferably, the thickness of the first portion 221 may be 1 mm-3 mm; more preferably, the thickness of the first portion 221 may be 1 mm-2 mm. In some embodiments, the thickness of the second portion 222 is 10 mm-200 mm; preferably, the thickness of the second portion 222 is 10 mm-180 mm; preferably, the thickness of the second portion 222 is 10 mm-150 mm; preferably, the thickness of the second portion 222 is 10 mm-100 mm; preferably, the thickness of the second portion 222 is 10 mm-50 mm; more preferably, the thickness of the second portion 222 is 30 mm-50 mm.

In some embodiments, referring to FIGS. 8-9, the second portion 222 is formed on the support membrane 220 in a state of protruding strip or groove, and the shape of the second portion 222 supports the membrane 220 and can be observed by human eyes and detection device such as microscopes, so that parameters such as the width and thickness of the second portion 222 may be clearly detected. In some embodiments, taking the second portion 222 in the shape of a protruding strip as an example, the second portion 222 in the shape of a protruding strip may be separated from the support membrane 220, for example, by spraying, adhering, hot press molding, physical vapor deposition or sputtering coating and the like the second portion on the support membrane 220. In some embodiments, taking the second portion 222 in the shape of a groove as an example, the groove-shaped second portion 222 may be formed by etching and the like. It is worth noting that at this time, it is required to dope a greater amount of the second material in the groove so as to ensure that the stiffness of the second portion 222 exceeds the stiffness of the first portion.

In some embodiments, the second portion 222 may also form different color differences and textures from the first portion 221, the first portion and the second portion may still be observed by human eyes and detection device such as microscopes, and parameters such as the width and thickness of the second portion 222 may also be clearly detected. In some embodiments, taking the texture difference between the second portion 222 and the first portion 221 as an example, the first portion and the second portion can be formed by doping the corresponding material in different regions of the support membrane, and texture processing is performed on the corresponding positions to be distinguished. In some embodiments, taking the second portion 222 in the shape of a protruding strip as an example, the shape of the protruding strip may include a rectangle or a waist or a trapezoid as viewed in a direction from the top or bottom of the screen component 2. In some embodiments, the shape of the second portion 222 is a rectangle. In some embodiments, the width size of the rectangle is 10 mm-300 mm; preferably, the size is 10 mm-200 mm; preferably, the size is 10 mm-150 mm; preferably, the size is 10 mm-100 mm; preferably, the size is 10 mm-50 mm; more preferably, the size is 10-20 mm. In some embodiments, the ratio of the length of the rectangle to the size of the edges of the screen component 2 in the second direction 1002 may be 0.8-1.1; preferably, may be 0.97; more preferably, may be 0.98. In some embodiments, the diameter of the waist is 10 mm-300 mm; preferably, the size is 10 mm-200 mm; preferably, the size is 10 mm-150 mm; preferably, the size is 10 mm-100 mm; preferably, the size is 10 mm-50 mm; more preferably, the size is 10-20 mm. The ratio of the straight edge length of waist to the size of the screen component 2 in the second direction 1002 may be 0.8-1.1; preferably, may be 0.97; more preferably, may be 0.98. It should be noted that the shape of the protruding strip-shaped second portion may also be set with reference to the shape of the support member 210 in the description.

In some embodiments, when the screen component 2 is developed, the support membrane 220 may support the screen component 2 at the back surface of the screen component 2. In some embodiments, when the screen component 2 is curled, the support membrane 220 may be located between the various curled layers of the screen component 2.

In some embodiments, the second portion 222 may be distributed at different positions relative to the screen component 2 in the first direction 1001, so that the stiffness of the flexible display device is different in the first direction 1001.

In some embodiments, the flexible display device 200 may be in the uniaxial curled form, and for the density distribution and gradual rule of the second portion 222, reference may be made to the relevant description of the support members 210 in FIG. 11.

In some embodiments, the flexible display device 200 may be in the double-axis curled form, and for the density distribution and gradual rule of the second portion 222, reference may be made to the relevant description of the support members 210 in FIG. 12.

In some embodiments, a support member 210 may be further provided on the second portion 222 to further increase the stiffness of the second portion 222, so as to meet the requirements of the flexible display device 200 in use.

Figure 13:
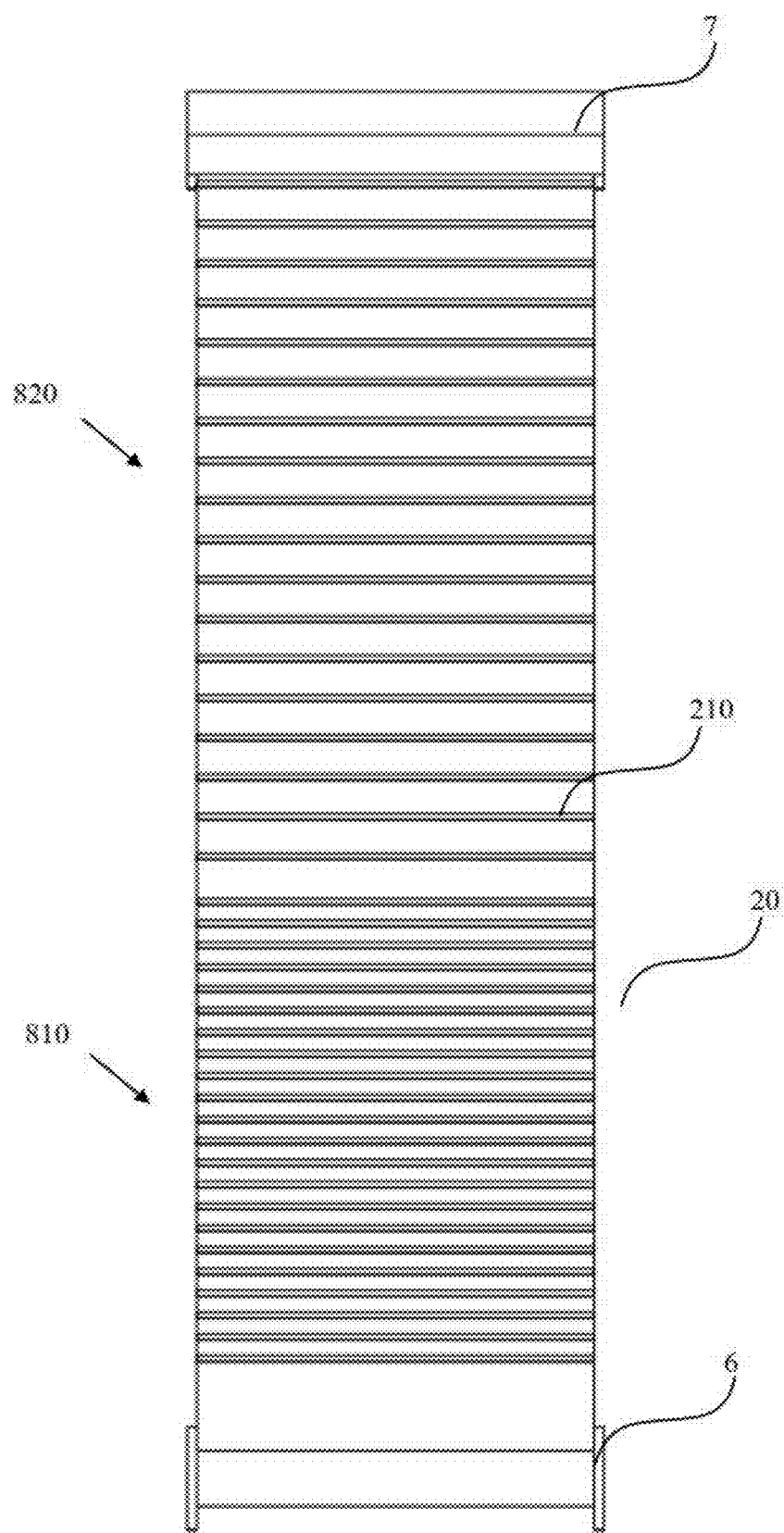
FIG. 13 is a schematic view of support member distribution when a flexible display device is in a uniaxial curled form shown according to the embodiments of the application.
Figure 14:
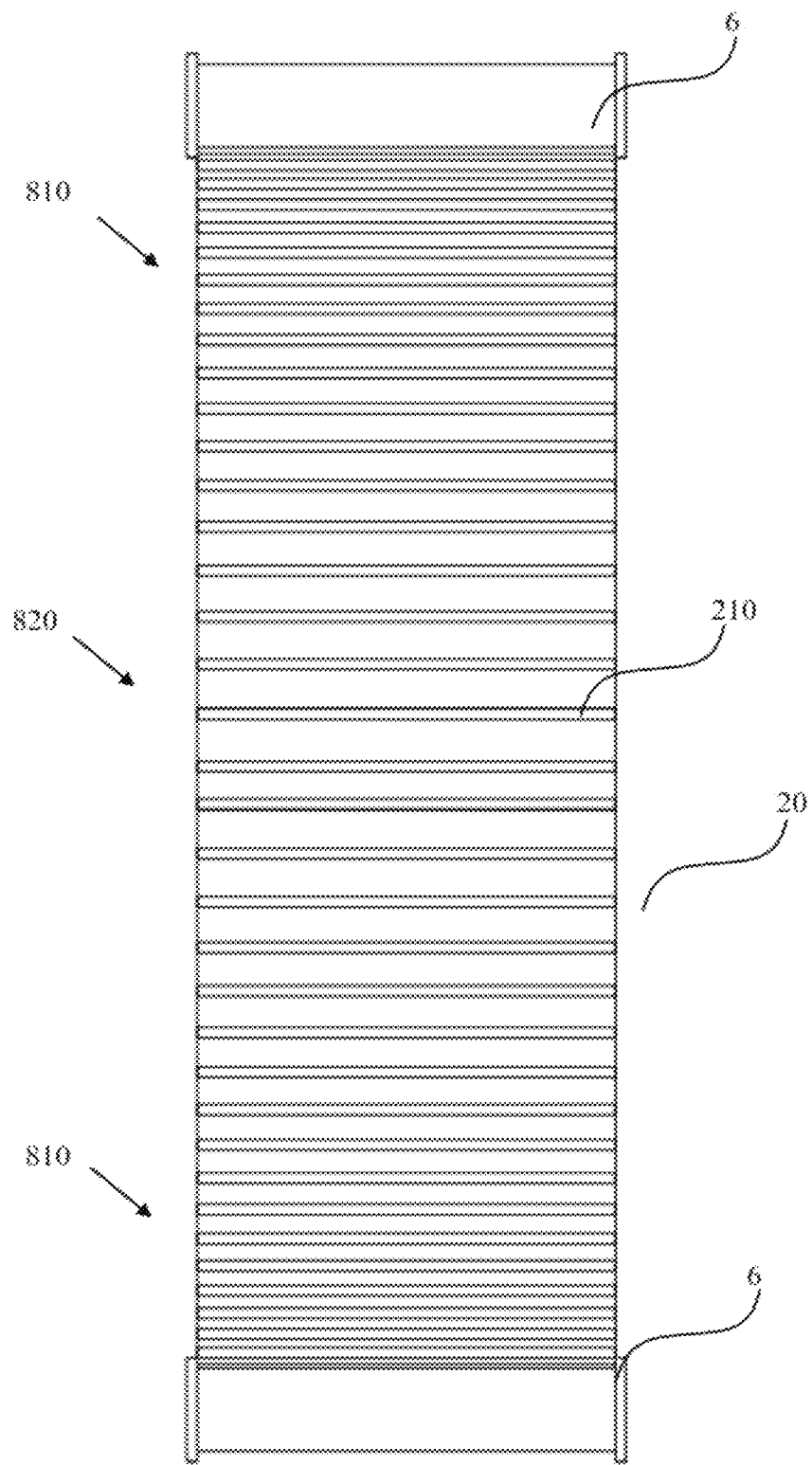
FIG. 14 is a schematic view of support member distribution when a flexible display device is in a double-axis curled form shown according to a sixth one of the embodiments of the application.

In some embodiments, the screen component 2, when being developed from the curled state, is required to be restored to the flat state, so as to facilitate the screen component 2 to perform picture display. In some embodiments, since the region close to the support shaft 6 of the flexible display device 200 has a larger curled deformation during curling, the elastic force required to restore the flexible display device 200 to be flat is greater. Therefore, it may be beneficial to restore the flatness of the region if the flexible display device has greater stiffness in this region. Therefore, in some embodiments, referring to FIGS. 13-14, the second region 820 may be the region close to the support shaft, and the first region 810 may be the region away from the support shaft. The density distributions of the support members 210 or the second portion 222 corresponding to the first region 810 and the second region 820 may be set with reference to the distribution rules in FIGS. 9 to 10.

In some embodiments, the support structure 20 includes a support membrane with several pattern holes 2301, i.e., the support membrane 230. In some embodiments, the pattern holes 2301 may reduce the stiffness of the corresponding region on the support membrane 230, that is, in the support membrane 230, the stiffness of the region with the pattern holes 2301 is less than the region without the pattern holes 2301. In some embodiments, the second support membrane may be a membrane layer disposed on the back surface of the lowermost layer in the screen component 2; and in some embodiments, may also be any membrane layer in the screen component 2 capable of being implemented with the scheme of several pattern holes.

Figure 15:
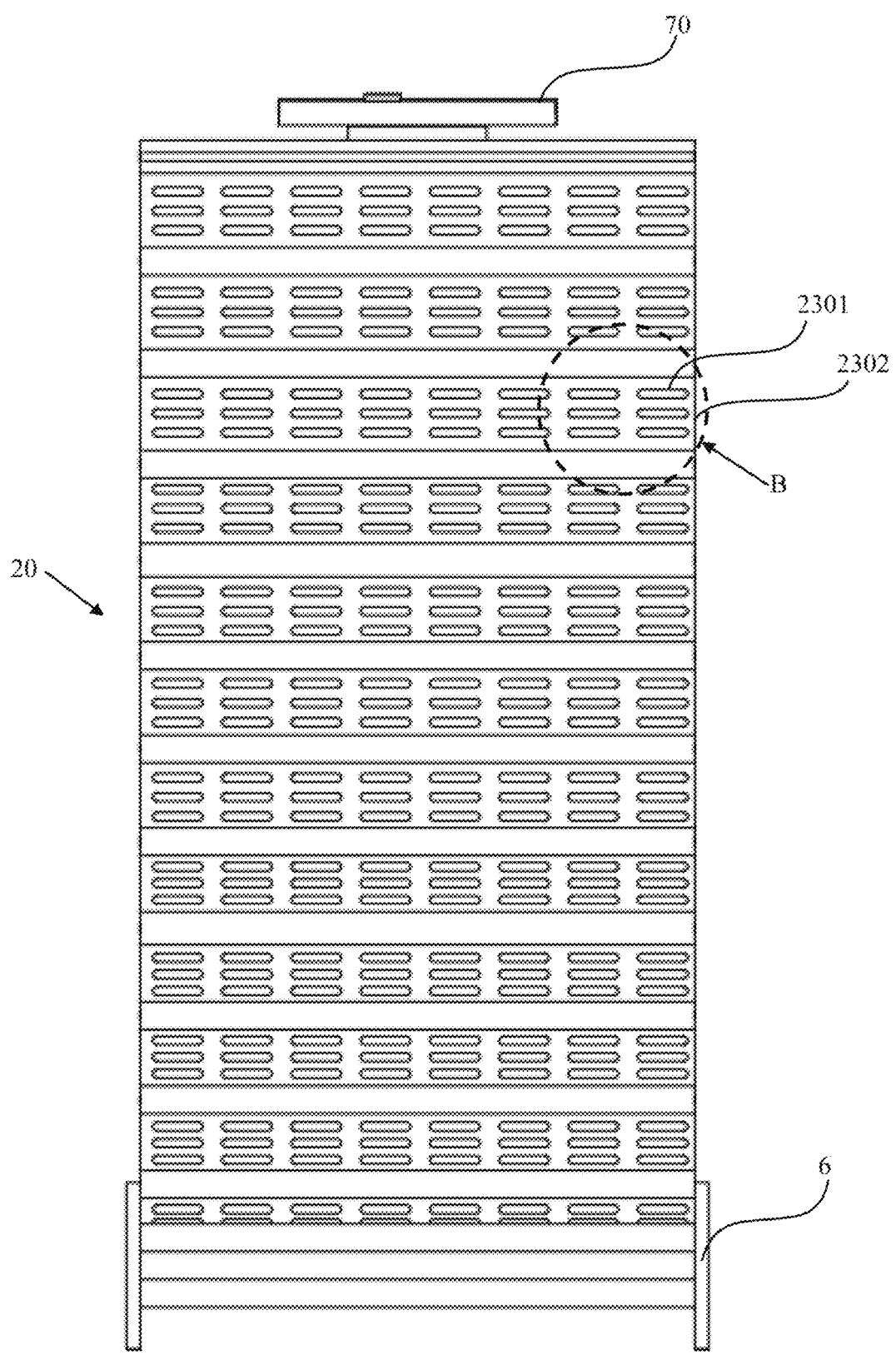
FIG. 15 is a schematic structural view of a support membrane of a flexible display device shown according to some embodiments of the application.
Figure 16:
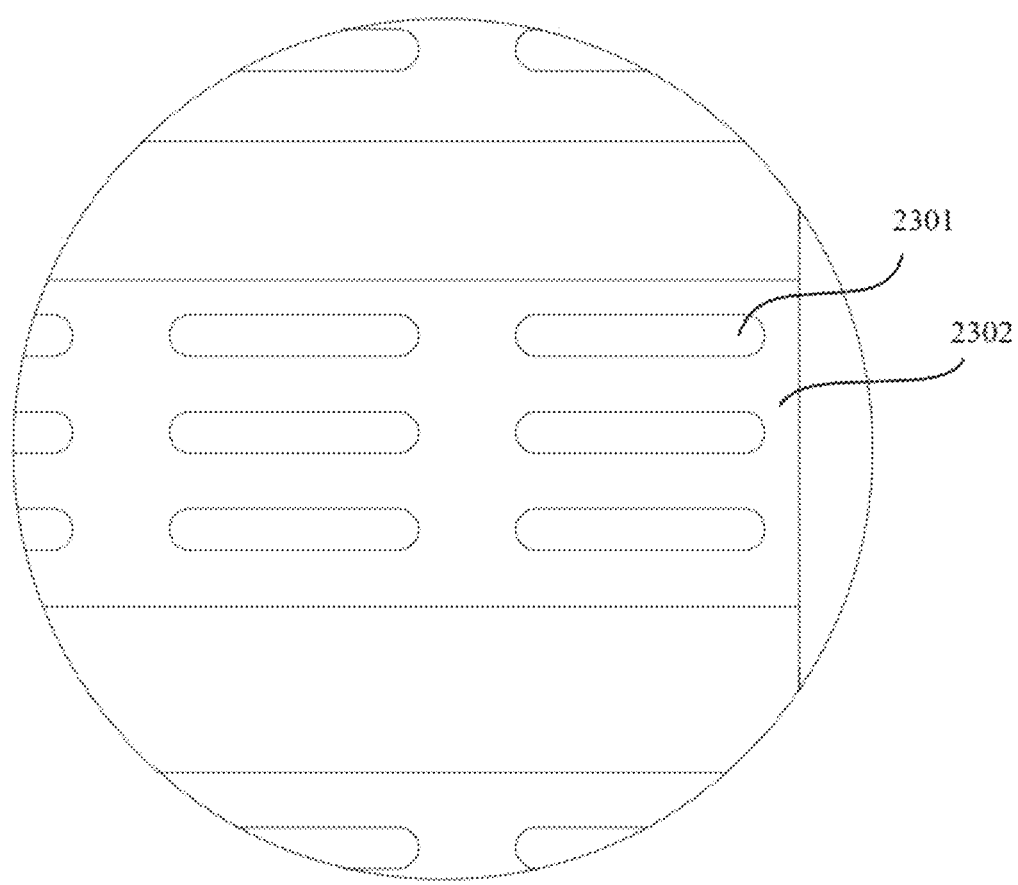
FIG. 16 is a schematic partial enlarged view of a region B in FIG. 15 according to the application.

In some embodiments, referring to FIGS. 15-16, the several pattern holes 2301 may be arranged in the second direction 1002 to form a pattern column 2302. For example, three pattern holes 2301 may form a small group in the first direction 1001, and the groups may be arranged at a certain separation distance in the second direction 1002 to form a pattern column 2302. In some embodiments, if a plurality of pattern holes 2301 are arranged in the first direction 1001 in a single pattern column 2301, the separation distance between adjacent pattern holes 2301 in the first direction 1001 may be 0.1 mm-1 mm, and the separation distance may be interpreted as the shortest linear distance between adjacent edge lines of adjacent pattern holes 2301. In some embodiments, the separation distance may also be 0.2 mm-1 mm; in some embodiments, the separation distance may also be 0.3 mm-1 mm; in some embodiments, the separation distance may also be 0.3 mm-0.8 mm; in some embodiments, the separation distance may also be 0.3 mm-0.5 mm; in some embodiments, the separation distance may also be 0.1 mm-0.5 mm; in some embodiments, the separation distance may also be 0.1 mm-0.3 mm. In some embodiments, the pattern columns 2302 may be distributed on the back surface of the screen component 2 in the first direction 1001. In some embodiments, the distribution rule of the pattern columns 2302 may be a uniform interval distribution. In some embodiments, the interval may be the separation distance between adjacent edges of adjacent pattern columns 2302. In some embodiments, the distribution rule of the pattern columns 2302 may also be a gradual interval distribution. In some embodiments, the separation distance of the pattern columns 2302 may be 0.1 mm-4 mm; in some embodiments, the separation distance may be 0.5 mm-4 mm; in some embodiments, the separation distance may be 0.8 mm-4 mm; in some embodiments, the separation distance may be 1 mm-4 mm; in some embodiments, the separation distance may be 2 mm-4 mm; in some embodiments, the separation distance may be 3 mm-4 mm; in some embodiments, the separation distance may be 0.1 mm-3 mm; in some embodiments, the separation distance may be 0.1 mm-2.5 mm; in some embodiments, the separation distance may be 0.1mm-2 mm; in some embodiments, the separation distance may be 1 mm-2 mm.

In some embodiments, the type of the pattern holes 2301 may include, but is not limited to, through hole, countersunk hole and the like. In some embodiments, the through hole may be interpreted as the pattern hole 2301 penetrating the entire support membrane 230, and the countersunk hole may be interpreted as the pattern hole 2301 not penetrating the support membrane 230. In some embodiments, the pattern holes 2301 in the pattern column 2302 may all be in the form of through hole. In some embodiments, the pattern holes 2301 in the pattern column 2302 may all be in the form of countersunk hole. In some embodiments, the pattern holes 2301 in the pattern column 2302 may also be partially in the form of through hole, and the remaining are in the form of countersunk hole. In some embodiments, when the pattern holes 2301 are countersunk holes, the direction of the countersunk holes may be downwardly concave or upwardly convex. Herein, taking the screen component 2 as an example, the surface for displaying a picture is upward.

In some embodiments, the shape of the pattern holes 2301 may include, but is not limited to, a circle, a rectangle, a waist, or a trapezoid. In some embodiments, the shape of the pattern holes 2301 is circular. In some embodiments, the diameter of the circular pattern holes may be 0.5 mm-3 mm; preferably, may be 1 mm-3 mm; more preferably, may be 1 mm-2 mm. In some embodiments, the shape of the pattern holes 2301 is a rectangular. In some embodiments, the length of the rectangular pattern holes may be 0.4 mm-2.8 mm; preferably, may be 0.8 mm-2.5 mm; more preferably, may be 1 mm-2 mm; the width of the rectangular pattern holes may be 0.3 mm-2.6 mm; preferably, may be 0.6 mm-2.2 mm; more preferably, may be 1 mm-2 mm. Here, the length of the rectangular pattern holes may be interpreted as the size of the rectangular pattern holes substantially parallel to the second direction; the width of the rectangular pattern holes may be interpreted as the size of the rectangular pattern holes substantially parallel to the first direction.

In some embodiments, the shape of the pattern holes 2301 is waisted. In some embodiments, the length of the straight sides of the waisted pattern holes may be 0.5 mm-3 mm; preferably, may be 1 mm-3 mm; more preferably, may be 1 mm-2 mm; the diameter of the waisted pattern holes may be 0.5 mm-3 mm; preferably, may be 1 mm-3 mm; more preferably, may be 1 mm-2 mm. In some embodiments, the shape of the pattern holes 2301 is trapezoidal. Here, the length of the straight sides of the waisted pattern holes may be interpreted as the size substantially parallel to the second direction.

In some embodiments, the waist length of the trapezoidal pattern holes may be 0.4 mm-2.8 mm; preferably, may be 0.6 mm-2.6 mm; more preferably, may be 0.8 mm-2.4 mm; the short side of the trapezoidal pattern holes may be 0.3 mm-2.6 mm; preferably, may be 0.6 mm-2.2 mm; more preferably, may be 1 mm-2 mm; for example, the short side may be 0.7 mm. The long side of the trapezoidal pattern holes may be 0.4 mm-2.8 mm; preferably, may be 0.8 mm-2.5 mm; more preferably, may be 1 mm-2 mm; for example, the long side may be 1.3 mm. Herein, the long side and the short side connecting the two waist lengths are substantially parallel to the first direction.

In some embodiments, if the two edge lines of the pattern hole in the first direction include a straight line segment, the two edge lines of the pattern hole may be parallel to the second direction, or may form a certain included angle with the second direction. The range of the included angle may be 0°-5°; preferably, the range of the included angle may be 0.1°-5°; preferably, the range of the included angle may be 0.1°-4°; preferably, the range of the included angle may be 0.1°-3°; preferably, the range of the included angle may be 0.1°-2.5°; preferably, the range of the included angle may be 0.15°-2°; preferably, the range of the included angle may be 0.1°-2°; preferably, the range of the included angle may be 0.1°-1.5°; preferably, the range of the included angle may be 0.1°-1°; preferably, the range of the included angle may be 0.1°-0.9°; preferably, the range of the included angle may be 0.1°-0.8°; preferably, the range of the included angle may be 0.1°-0.7°; preferably, the range of the included angle may be 0.1°-0.6°; preferably, the range of the included angle may be 0.1°-0.5°. For example, the shape of the pattern holes 2301 is rectangular or waisted, and the included angle between the longitudinal edge line of the rectangle or the waist and the second direction 1002 is 0°-3°; preferably, is 0°-1°; more preferably, is 0°-0.5°. For another example, the shape of the pattern holes 2301 is trapezoidal, and the included angle between the longitudinal edge line of the trapezoid and the second direction 1002 is 0°-3°; preferably, is 0°-1°; more preferably, is 0°-0.5°.

In some embodiments, the patter columns 2302 may be set with different distribution densities in the first direction 1001, so that the stiffness of the flexible display device is different in the first direction 1001. In some embodiments, the distribution density of the pattern columns may be reflected by the aperture ratio of the pattern columns 2302 in the corresponding region. In some embodiments, the aperture ratio of the region corresponding to the pattern columns 2302 may be 0.2-0.8; preferably, may be 0.4-0.8; more preferably, may be 0.6-0.8. The aperture ratio may be interpreted as the ratio of the area where the pattern holes are formed in a specified area of the support membrane 230 to the specified area. In some embodiments, the specified area may be the entire area of the support membrane 230. In some embodiments, the specified area may also be a partial area of the support membrane 230. For example, the partial area may be the area of a pattern column distributed in the second direction plus the area of a gap adjacent to said pattern column. For example, the partial area may be the first region or the second region hereinafter.

In some embodiments, the flexible display device 200 may be in the uniaxial curled form, and the aperture ratio of the pattern columns 2302 in the partial area may be gradually distributed in the first direction 1001. In some embodiments, the aperture ratio of the pattern columns 2302 is higher in a region close to the support shaft 6 and lower in the region away from the support shaft 6.

In some embodiments, the region of the pattern columns 2302 away from the support shaft 6 may correspond to the first region 810, and the region close to the support shaft 6 may correspond to the second region 820. In some embodiments, for the widths of the first region 810 and the second region 820, reference may be made to the relevant description of the first region and the second region in the uniaxial curled form in other sections of the description, which will not be repeated here. In some embodiments, the aperture ratio of the pattern columns 2302 in the first region 810 may be the first aperture ratio, and the aperture ratio corresponding to the second region 820 may be the second aperture ratio. Herein, the first aperture ratio is greater than the second aperture ratio. In some embodiments, the flexible display device 200 may be in the double-axis curled form, and the aperture ratio of the pattern columns 2302 in the partial area may be gradually distributed in the first direction 1001 from the center to both sides. In some embodiments, the aperture ratio of the pattern columns 2302 is higher in the regions close to the support shafts 6 at both sides and lower in the region corresponding to the center of the screen component 2. In some embodiments, the region of the pattern columns 2302 located in the center of the screen component 2 may correspond to the first region 810, and the regions close to the support shafts 6 at both sides may correspond to the second region 820. In some embodiments, for the widths of the first region 810 and the second region 820, reference may be made to the relevant description of the first region and the second region in the double-axis curled form in other sections of the description, which will not be repeated here. In some embodiments, the second region 820 is symmetrically distributed on both sides of the first region 810.

In some embodiments, at different positions of the pattern columns 2302 in the first region and the second region in the first direction, the aperture ratio may be set uniformly, or may also be set gradually.

Figure 17:
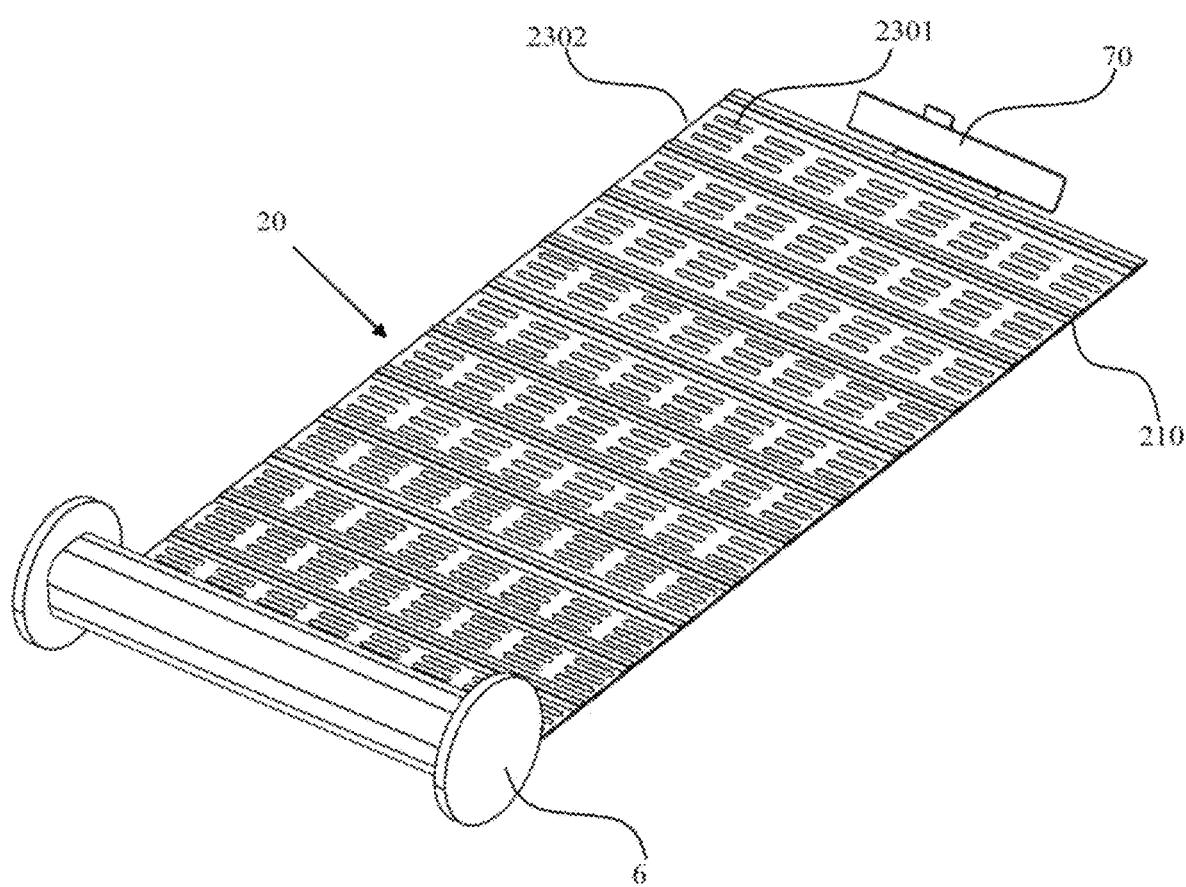
FIG. 17 is a schematic view a quadrate-shaft flexible display device in a developed state shown according to some embodiments of the application.

In some embodiments, the support membrane 230 in the support structure may also include several second portions 222 and pattern columns 2302. Referring to FIG. 17, the support structure includes several pattern columns 2302, three pattern columns 2302 form an array group, and a support sub-part 2221 is provided between two adjacent array groups.

In some embodiments, the cross section of the support shaft 6 of the flexible display device 200 may be circular, or may also be square. In some embodiments, if the cross section of the support shaft 6 of the flexible display device 200 is circular, the support structure 20 may be the support structure described in any embodiment described above.

Figure 18:
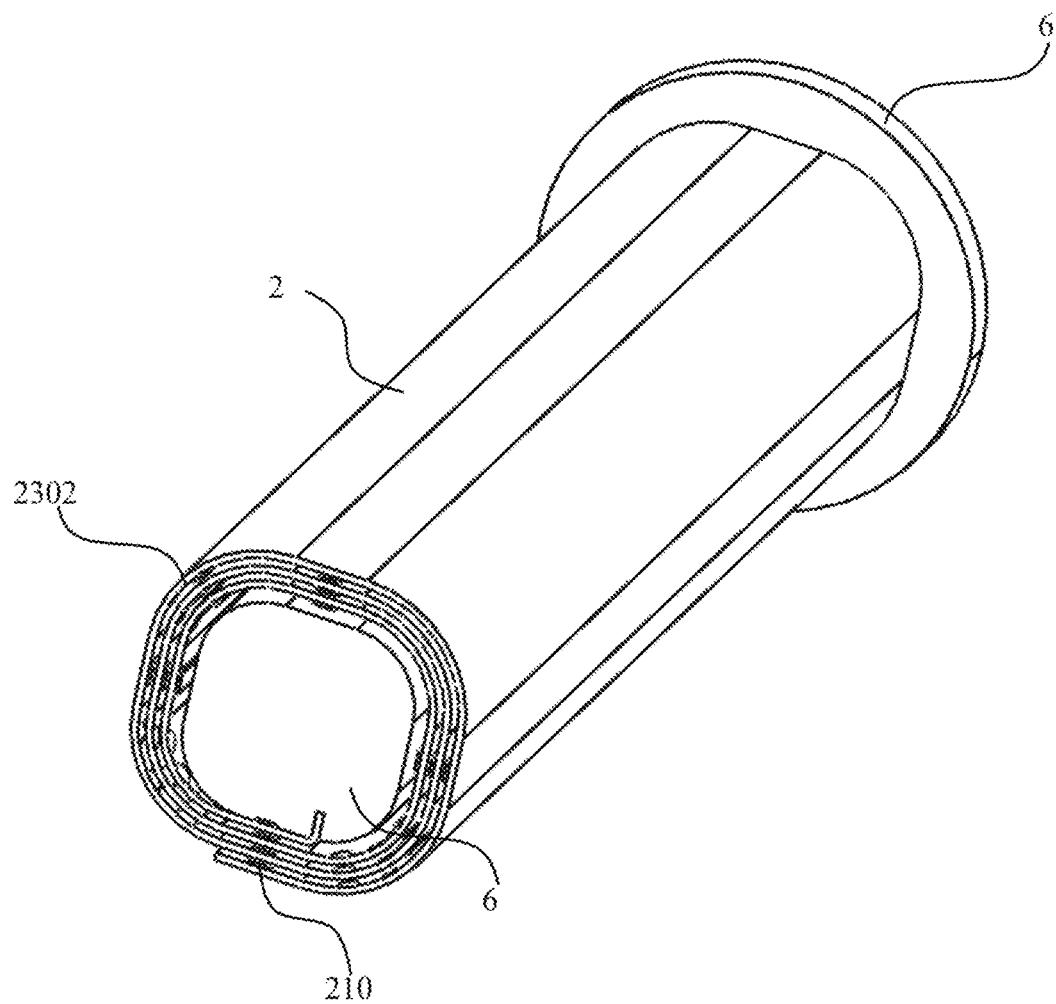
FIG. 18 is a schematic structural view of a quadrate-shaft flexible display device in a curled state shown according to some embodiments of the application.

In some embodiments, if the cross section of the support shaft 6 of the flexible display device 200 is square, further reference may be made to FIGS. 17 and 18 for the structure of the support structure 20.

In some embodiments, as shown in FIG. 17, if the cross section of the support shaft 6 of the flexible display device 200 is square, the support structure 20 may include support members 210 and/or pattern columns 2302 distributed at intervals. For example, the support structure 20 may include the support members 210 distributed at intervals only. For another example, the support structure 20 may include the pattern columns 2302 distributed at intervals only. For yet another example, the support structure 20 may include the support members 210 and the pattern columns 2302 distributed at intervals from each other.

In some embodiments, the distribution separation distance of support members 210 and/or the pattern columns 2302 may be gradual. In some embodiments, the distribution density of the support members 210 and the pattern columns 2302 is higher at the side of the support structure 20 close to the support shaft; the distribution density of the support members 210 and the pattern columns 2302 is higher at the side of the support structure 20 away from the support shaft. In some embodiments, the ratio corresponding to the distribution density of the support members 210 may be 1:10-1:1; preferably, may be 1:9-1:1; preferably, may be 1:8-1:1; preferably, may be 1:7-1:1; preferably, may be 1:6-1:1; more preferably, may be 1:5-1:1. In some embodiments, the aperture ratio corresponding to the distribution density of the pattern columns 2302 may be 0.2-0.8; preferably, may be 0.4-0.8; more preferably, may be 0.6-0.8.

In some embodiments, the support structure 20 may include support members 210 and pattern columns 2302 distributed at intervals from each other. When the screen component 2 is curled, further referring to FIG. 18, the support members 210 may correspond to the sides of the support shaft 6. In some embodiments, the pattern columns 2302 may correspond to the seamed edges of the support shaft 6. In some embodiments, each side of the support shaft 6 may correspond to one support member 210 respectively. In some embodiments, each edge of the support shaft 6 may correspond to one pattern column 2302 respectively. The support structure 20 of the embodiment may facilitate the flexible display device 200 with a square support shaft to perform the curling operation of the screen component 2. Since the pattern columns 2302 have lower stiffness, the screen component 2 may be better stored after the screen component 2 is curled.

In some embodiments, the support structure 20 may also include the support members 210 distributed at intervals only. When the screen component 2 is curled, the support members 210 may correspond to the sides of the support shaft 6, and the seamed edges of the support shaft 6 may correspond to the gap between two adjacent support members 210.

In some embodiments, the support structure 20 may also include pattern columns 2302 distributed at intervals only. When the screen component 2 is curled, the pattern columns 2302 may correspond to the seamed edges of the support shaft 6, and the sides of the support shaft 6 may correspond to the gap of the pattern columns 2302.

In some embodiments, in order to avoid the seamed edges of the square support shaft 6 from damaging the support structure 20, the seamed edges of the support shaft 6 may be chamfered. In some embodiments, the chamfer may be a rounded corner, and the size of the chamfer may be represented by a radius R value of the rounded corner. In some embodiments, the radius R value of the chamfer may be R1-R7; in some embodiments, the radius R value of the chamfer may be R1-R6; in some embodiments, the radius R value of the chamfer may be R1-R5. In some embodiments, the radius R value of the chamfer may be R1-R4; in some embodiments, the radius R value of the chamfer may be R1-R3; in some embodiments, the radius R value of the chamfer may be R1-R2. Here, the R1 indicates that the radius value of the rounded corner is 1 mm, and similarly, the R7 indicates that the radius value of the rounded corner is 7 mm, and the remaining will not be repeated. In some embodiments, if the support structure 20 includes the pattern columns 2302, after the screen component 2 is curled, the chamfered region of the support shaft 6 may correspond to the position of the pattern columns 2302. Here, the size of the pattern columns 2302 in the first direction 1001 is greater than the arc length of the chamfer.

In some embodiments, when the support structure 20 includes several support members or several second portions, after the screen component 2 is curled, the chamfered region of the support shaft 6 may correspond to the separation distance gap of the support members or the second portions. Correspondingly, in the developed state, the separation distance gap of the support members or the second portions is greater than the arc length of the chamfer at the corresponding position.

In some embodiments, the application further provides a display system with a flexible display device, and the display system includes a terminal device and a flexible display device connected to the terminal device. Here, any flexible display device may be the flexible display device in one or more embodiments of the above sections of the description. In some embodiments, the flexible display device may be fixedly connected to the terminal device, and the terminal device provides power and outputs a display signal to the flexible display device. In some embodiments, the flexible display device may also be detachably connected to the terminal device. When the display system is required to display a picture, the flexible display device may be connected to the terminal device to display a picture; when the display system is not required to display a picture, the flexible display device may be separated from the terminal device for storage of the flexible display device. Here, the type of detachably connecting the flexible display device to the terminal device may include a pluggable wired connection. In some embodiments, the connection type between the flexible display device and the terminal device may further include a wireless connection, so as to avoid a trouble caused by a connection line between the flexible display device and the terminal device. In some embodiments, the terminal device may also be integrated in the flexible display device. Here, the terminal device includes, but is not limited to, a cellphone, a computer, a television, a keyboard, an electronic book, a vehicle-mounted display terminal and the like.

Possible benefits of one or more of the embodiments disclosed in the application include, but are not limited to: (1) the flexible display device of the application has lower stiffness in the curled direction, and may facilitate the curling operation; (2) the flexible display device of the application has higher stiffness in the second direction perpendicular to the curled direction, and may play a better role for supporting after the screen component is developed, so as to make displaying more stable; (3) by means of the different distribution rules of the support members or the second portions or the pattern holes, the rebound force of the screen component upon curling may be reduced effectively; (4) by means of the different distribution rules of the support structure, the flatness of the screen component after being developed may be effectively improved.

As described above are only preferable embodiments of this application, which are not intended to limit the application. Any modification, equivalent substitution, improvement and the like, made within the spirit and principle of the application, shall be included in the protection scope of the application.

What is claimed is:

1. A flexible display device, comprising:
a screen component; and
a support structure disposed on the screen component; wherein the flexible display device has different stiffness values in a first direction and in a second direction, the first direction is a direction in which the screen component is configured to curl up, the second direction is perpendicular to the first direction, and stiffness values of the flexible display device gradually increase along the second direction away from the first direction.

2. The flexible display device of claim 1, wherein the flexible display device has a stiffness value of 0.1 GPa-10 GPa in the first direction and a stiffness value of 10 GPa-300 GPa in the second direction.

3. The flexible display device of claim 1, wherein the support structure further comprises:
a plurality of support members distributed in the first direction.

4. The flexible display device of claim 3, wherein a material of the support members comprises:
steel or a titanium alloy or an aluminum alloy.

5. The flexible display device of claim 3, wherein the plurality of support members has a stiffness values of 50 GPa-300 GPa.

6. The flexible display device of claim 3, wherein the support structure further comprises:
a flexible polymeric material between adjacent support members of the plurality of support members.

7. The flexible display device of claim 1, wherein the support structure further comprises
a first portion having a first stiffness; and
a second portion having a second stiffness, wherein the second stiffness is greater than the first stiffness.

8. The flexible display device of claim 7, wherein the support structure further comprises:
a support membrane, wherein the first portion and the second portion are different regions in the support membrane.

9. The flexible display device of claim 7, wherein the first portion comprises a first material, the second portion comprises a second material, and a stiffness of the second material is greater than a stiffness of the first material.

10. The flexible display device of claim 9, wherein a material of the second material comprises a flexible polymeric material.

11. The flexible display device of claim 3, wherein a ratio of a size of the plurality of support members in the first direction to a size of a gap adjacent to one of the support members in the first direction is 1:10-1:1.

12. The flexible display device of claim 3, wherein the flexible display device is in a double-axis curled form, a ratio of the size of the plurality of support members in the first direction to a gap adjacent to one of the support members in the first direction is 1:10-1:1.

13. The flexible display device of claim 3, wherein the plurality of support members is distributed non-uniformly relative to the screen component in the first direction, such that a stiffness of the screen component in the first direction is non-uniform.

14. The flexible display device of claim 13, wherein, in the first direction, the flexible display device comprises at least a first region and a second region, and a stiffness of the first region in the first direction is greater than a stiffness of the second region in the first direction.

15. The flexible display device of claim 1, wherein the support structure further comprises:
a support membrane with a plurality of pattern holes.

16. The flexible display device of claim 15, wherein the plurality of pattern holes comprise a plurality of pattern columns arranged in the second direction, and adjacent pattern columns have different separation distances.

17. The flexible display device of claim 16, wherein a separation distance between adjacent pattern columns is 0.1 mm-4 mmn.

18. The flexible display device of claim 15, wherein the plurality of pattern holes has an open porosity of 0.2-0.8 with respect to a specified region on the support membrane.

19. A display system, comprising the flexible display device of claim 1 and a terminal device connected to the flexible display device.

* * * * *